US012734084B2

(12) United States Patent
Sasaki

(10) Patent No.: US 12,734,084 B2
(45) Date of Patent: Sep. 15, 2026

(54) ASSISTANCE DEVICE AND MOVING DEVICE USING SAME

(71) Applicant: Qolo Inc., Tsukuba (JP)

(72) Inventor: Kai Sasaki, Ibaraki (JP)

(73) Assignee: Qolo Inc.

( * ) Notice: Subject to any disclaimer, the term of this patent is extended or adjusted under 35 U.S.C. 154(b) by 30 days.

(21) Appl. No.: 18/722,911

(22) PCT Filed: Dec. 21, 2022

(86) PCT No.: PCT/JP2022/047060

§ 371 (c)(1),
(2) Date: Jun. 21, 2024

(87) PCT Pub. No.: WO2023/127630

PCT Pub. Date: Jul. 6, 2023

(65) Prior Publication Data

US 2025/0064657 A1 Feb. 27, 2025

(30) Foreign Application Priority Data

Dec. 27, 2021 (JP) ................................ 2021-212362

(51) Int. Cl.
*A61G 5/14* (2006.01)

(52) U.S. Cl.
CPC ..................................... *A61G 5/14* (2013.01)

(58) Field of Classification Search
CPC .. A61G 5/14; A61G 2200/36; A61G 2200/34; A61G 7/1086
See application file for complete search history.

(56) References Cited

U.S. PATENT DOCUMENTS

| | | | |
|---|---|---|---|
| 4,907,303 | A | 3/1990 | Baird |
| 5,803,545 | A | 9/1998 | Guguin |
| 2014/0138995 | A1 | 5/2014 | Leib |
| 2022/0287894 | A1 | 9/2022 | Suzuki et al. |

FOREIGN PATENT DOCUMENTS

| | | |
|---|---|---|
| CN | 111315337 | 6/2020 |
| EP | 3721849 | 10/2020 |
| EP | 3721850 | 10/2020 |
| JP | S47-030934 | 8/1972 |
| JP | H03-075328 | 7/1991 |
| JP | 2010-158284 | 7/2010 |
| JP | 2014-520604 | 8/2014 |
| JP | 2016-049210 | 4/2016 |

(Continued)

OTHER PUBLICATIONS

Trans. JP-2016049210-A (Year: 2025).*

(Continued)

*Primary Examiner* — J. T. Newton

(57) ABSTRACT

An assistance device that can independently control an assistance of a bending and stretching motion of a knee and an assistance of an upper body posture is provided. An assistance device includes a base, a first link fixed to the base, a second link rotatably coupled to the first link, a third link rotatably coupled to the second link, and an elastic connection portion incorporated between a predetermined position on the first link or the base and the third link.

11 Claims, 25 Drawing Sheets

(56) References Cited

FOREIGN PATENT DOCUMENTS

| | | | | |
|---|---|---|---|---|
| JP | 2016049210 A | * | 4/2016 |
| JP | 2019-037670 | | 3/2019 |
| WO | 2021/040024 | | 3/2021 |

OTHER PUBLICATIONS

International Search Report for PCT/JP2022/047060 mailed on Mar. 14, 2023.

Office Action dated Jun. 17, 2026 issued with respect to the corresponding Chinese patent application No. 202280085941.2.

* cited by examiner

ASSISTANCE DEVICE AND MOVING DEVICE USING SAME

TECHNICAL FIELD

The present invention relates to an assistance device of a posture transition and a moving device using the same.

BACKGROUND ART

Standing-up and sitting-down motions are one of basic motions of humans and are motions indispensable for daily life. There is a need for an appropriate assistance device for a posture transition for those who have difficulty in standing up or sitting down on their own due to congenital or acquired impairment of a lower limb, deterioration in physical function due to aging, and the like. If a person can stand up and sit down without depending on a caregiver using an assistance device, the activity range in daily life is widened, and the quality of life (QOL) is also increased. Various devices that aid and assist standing up, sitting down, walking, moving, and the like have been developed so far.

In a case of lower limb paralysis due to spinal cord injury or the like or deterioration in physical function due to aging, an aid to the upper body posture is often necessary in addition to an assistance to the leg and hip when standing up or sitting down. A device that assists the posture of an upper body in conjunction with a motion of a knee joint of a user has been proposed (see, for example, Patent Document 1).

CITATION LIST

Patent Document

Patent Document 1: WO 2021/040024 A

SUMMARY OF INVENTION

Technical Problem

In Patent Document 1, the posture of the upper body is controlled together with the assistance of the lower limb, but the assistance force of the lower limb and the assistance force of the upper body cannot be adjusted independently. In this document, a link that gives a rotation moment in accordance with the rotation of the knee joint and a link that supports the torso are coupled by a complicated force transmission mechanism. Depending on the generation and magnitude of the force assisting the rotation of the knee joint, an assistance force of the torso is generated and the upper body is supported. Those having difficulty in standing up or sitting down often require different assistance force and assistance timing depending on their body parts, such as those whose upper body force is extremely weak and those whose upper body is healthy but lower limbs do not move. A flexible assistance device in accordance with individual physical characteristics and residual ability of the body trunk is required.

An object of the present invention is to provide an assistance device that can independently control an assistance of a bending and stretching motion of a knee and an assistance of an upper body posture.

Solution to Problem

In one embodiment, an assistance device includes:

a base;

a first link fixed to the base;

a second link rotatably coupled to the first link;

a third link rotatably coupled to the second link; and an elastic connection portion incorporated between a predetermined position on the first link or the base and the third link.

Advantageous Effects of Invention

An assistance device that can independently control an assistance of a bending and stretching motion of a knee and an assistance of an upper body posture is achieved. This enables a flexible assistance of the upper body and the lower body during a standing-up and sitting-down motion in accordance with individual physical characteristics and residual ability of the body trunk.

DESCRIPTION OF EMBODIMENTS

Figure 1:
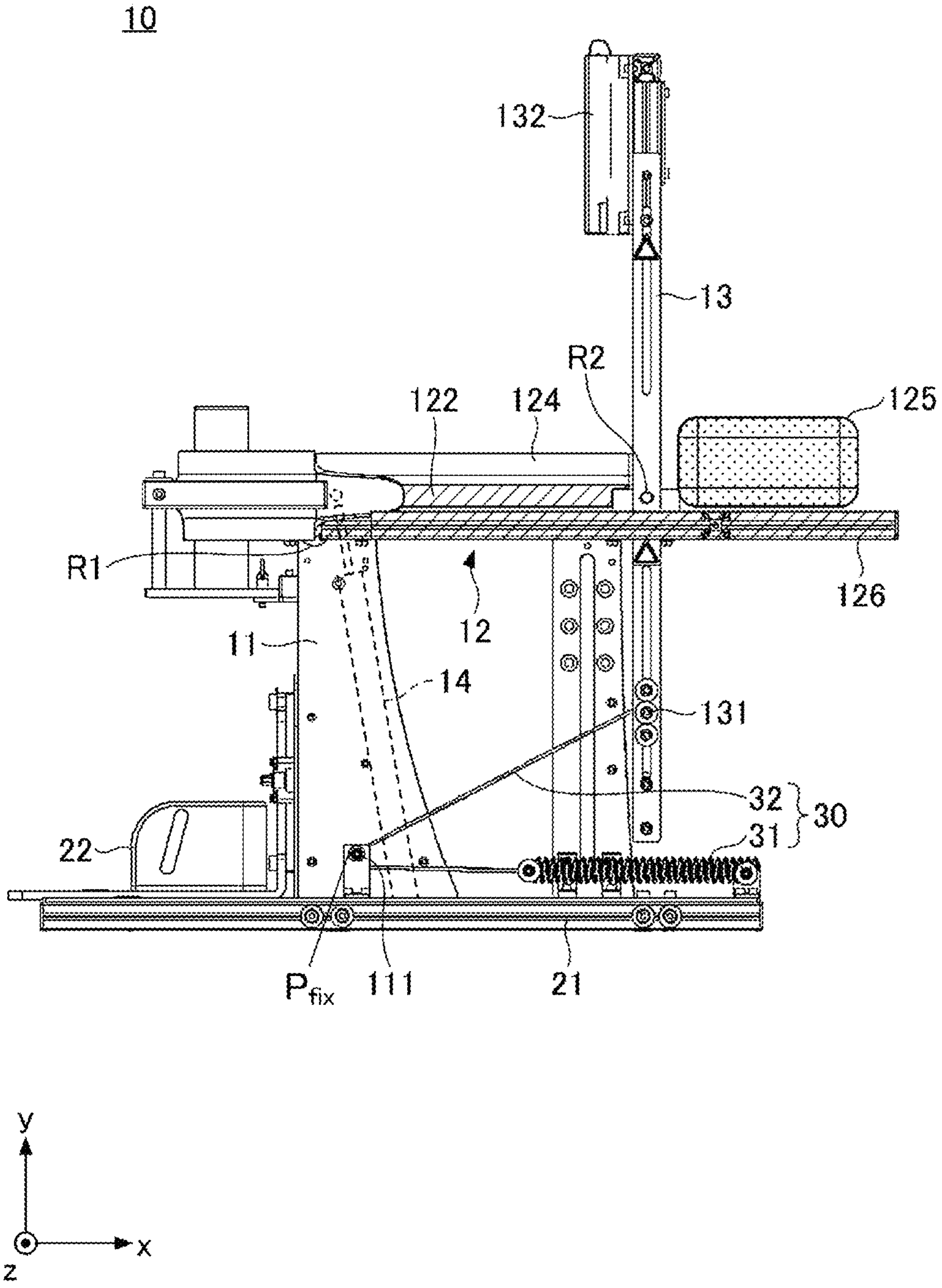
FIG. 1 is a side view of a sitting position state of an assistance device of a first embodiment.

Hereinafter, embodiments of the present invention will be described with reference to the drawings. The following embodiments are examples for embodying the technical idea of the invention, and the present invention is not limited to the following configurations. In the drawings, members having an identical function are denoted by identical reference signs, and redundant description may be omitted. The size and positional relationship of the members illustrated in the drawings may be exaggerated for facilitating understanding of the invention.

First Embodiment

Figure 2:
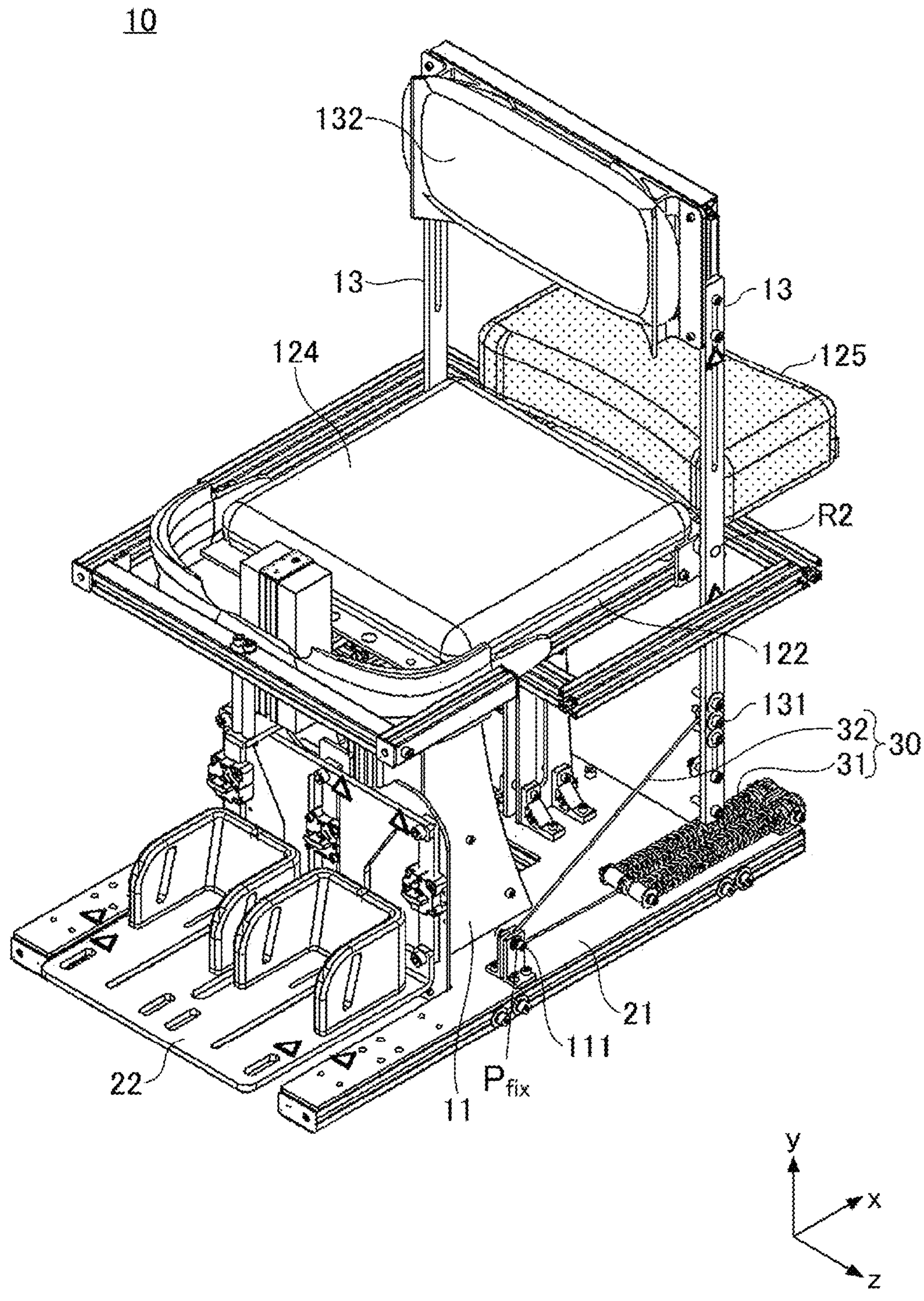
FIG. 2 is a perspective view of the sitting position state of the assistance device of the first embodiment.

FIG. 1 is a side view of the sitting position state of an assistance device 10 of the first embodiment, and FIG. 2 is a perspective view of the sitting position state of the assistance device 10. As coordinate axes, a front-rear direction of the assistance device 10 is an x-axis, a height direction is a y-axis, and a width direction is a z-axis. An xy plane is a sagittal plane.

The assistance device 10 includes a base 21, a first link 11 fixed to the base 21, a second link 12 rotatably coupled to the first link 11, a third link 13 rotatably coupled to the second link, and an elastic connection portion 30 incorporated between a predetermined position Pfix on the first link 11 or the base 21 and the third link 13. In the first embodiment, since the position Pfix is at a fixed position on the first link 11 or the base 21, the position Pfix is called a fixed position in the following description of the first embodiment.

The second link 12 has a seating surface 122 and an extension portion 126 extending rearward relative to the seating surface 122. In the sitting position state, the second link 12 is positioned substantially parallel to the base 21, and the third link is positioned substantially perpendicular to the base 21. The "substantially parallel" and "substantially perpendicular" mean not strictly requiring an angle of 0° or 90° with respect to the base 21 but including a degree of freedom in design of approximately ±15° depending on the application such as rehabilitation or employment. When the second link 12 is in a first position substantially parallel to the base 21, it corresponds to the sitting position of the assistance device 10. When the second link 12 is rising substantially perpendicularly to the base 21 at an angle of about 80°±10°, it corresponds to the standing position of the assistance device 10.

The base 21 may be provided with a footrest 22. The seating surface 122 of the second link 12 may be provided with a cushion 124. The extension portion 126 may be provided with a lumbar support pillow 125. The third link 13 may be provided with a backrest 132. The cushion 124, the lumbar support pillow 125, and the backrest 132 are not essential elements for the assistance device 10, but are useful for enhancing the usability.

The second link 12 is rotatable about the rotation center R1 with respect to the first link 11 that is fixed. The rotation of the rotation center R1 corresponds to the rotation of the knee joint of the user, and the rotation of the second link 12 about the rotation center R1 corresponds to a motion of the thigh due to the extension and bending of the knee of the user. The third link 13 is rotatable about the rotation center R2 with respect to the second link 12. The rotation of the rotation center R2 corresponds to the rotation of the hip joint of the user, and the rotation of the third link 13 about the rotation center R2 corresponds to a change in the upper body posture accompanying a posture transition of the user.

The third link 13 is coupled to the fixed position Pfix on the assistance device 10 by the elastic connection portion 30. Any member and configuration may be adopted as the elastic connection portion 30 as long as the rotation of the third link 13 can be controlled by the elastic force. In the examples of FIGS. 1 and 2, the elastic connection portion 30 includes a spring 31 and a wire 32. One end of the spring 31 is fixed to the rear end part of the base 21, and the other end is connected to the wire 32. The wire 32 is coupled to a coupling point 131 on the third link 13 through a pulley 111 provided at the fixed position Pfix.

Based on the positional relationship between the first link 11 and the second link and the positional relationship between the second link 12 and the third link 13, the fixed position Pfix is desirably positioned on a near (−x) side relative to the rotation center R2 of the third link 13 throughout the entire process of the assistance device 10 from the sitting position to the standing position. In the examples of FIGS. 1 and 2, the fixed position Pfix is provided in the vicinity of the first link 11 on the base 21, but the fixed position Pfix is not limited to this position. As described later, the fixed position Pfix may be provided on the first link 11. When the assistance device 10 transitions from the sitting position to the standing position or from the standing position to the sitting position, the rotation of the third link 13 with respect to the second link 12 is controlled by the elastic connection portion 30, whereby the timing and moment of the rotation of the third link 13 can be adjusted without supplying power of a motor, a battery, or the like. The control of the rotation of the third link by the elastic connection portion unit 30 is performed independently of the control of the rotation of the second link 12 with respect to the first link 11.

The rotation of the second link 12 with respect to the first link 11 also does not require supply of power of a motor, a battery, or the like. For example, the inside of the first link may be provided with a passive actuator 14 using elastic force. As the passive actuator, a gas spring, a viscoelastic damper using liquid pressure, a coil spring, a rubber spring, or the like can be used. The passive actuator 14 drives the second link while varying an assistance moment in accordance with the relationship between the rotation center and the position of the center of gravity of the user and the knee joint angle triggered by a change in the load acting on the rotation center R1 due to the change in the upper body posture of the user.

Figure 3:
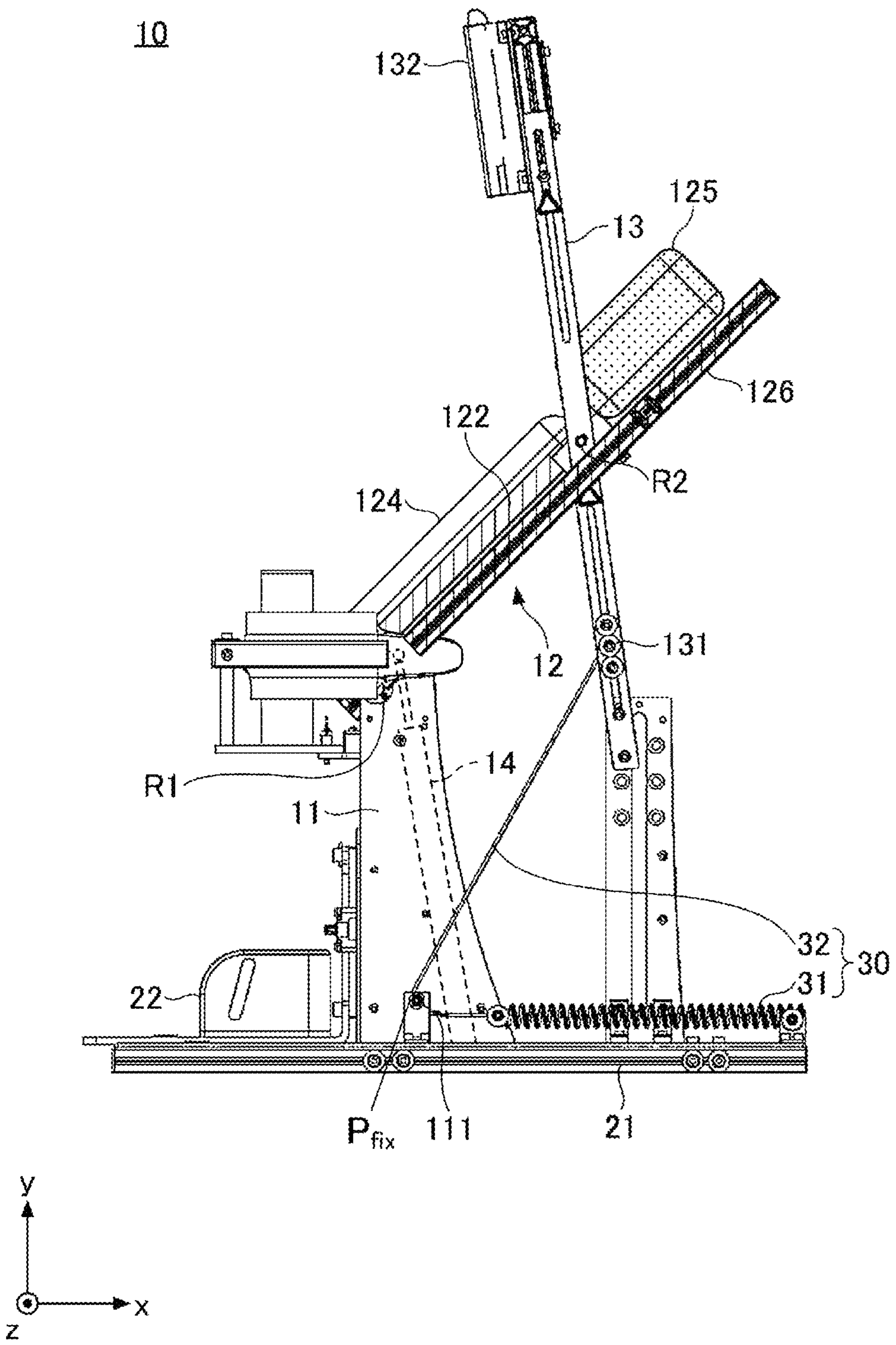
FIG. 3 is a side view in the middle of posture change of the assistance device of the first embodiment.
Figure 4:
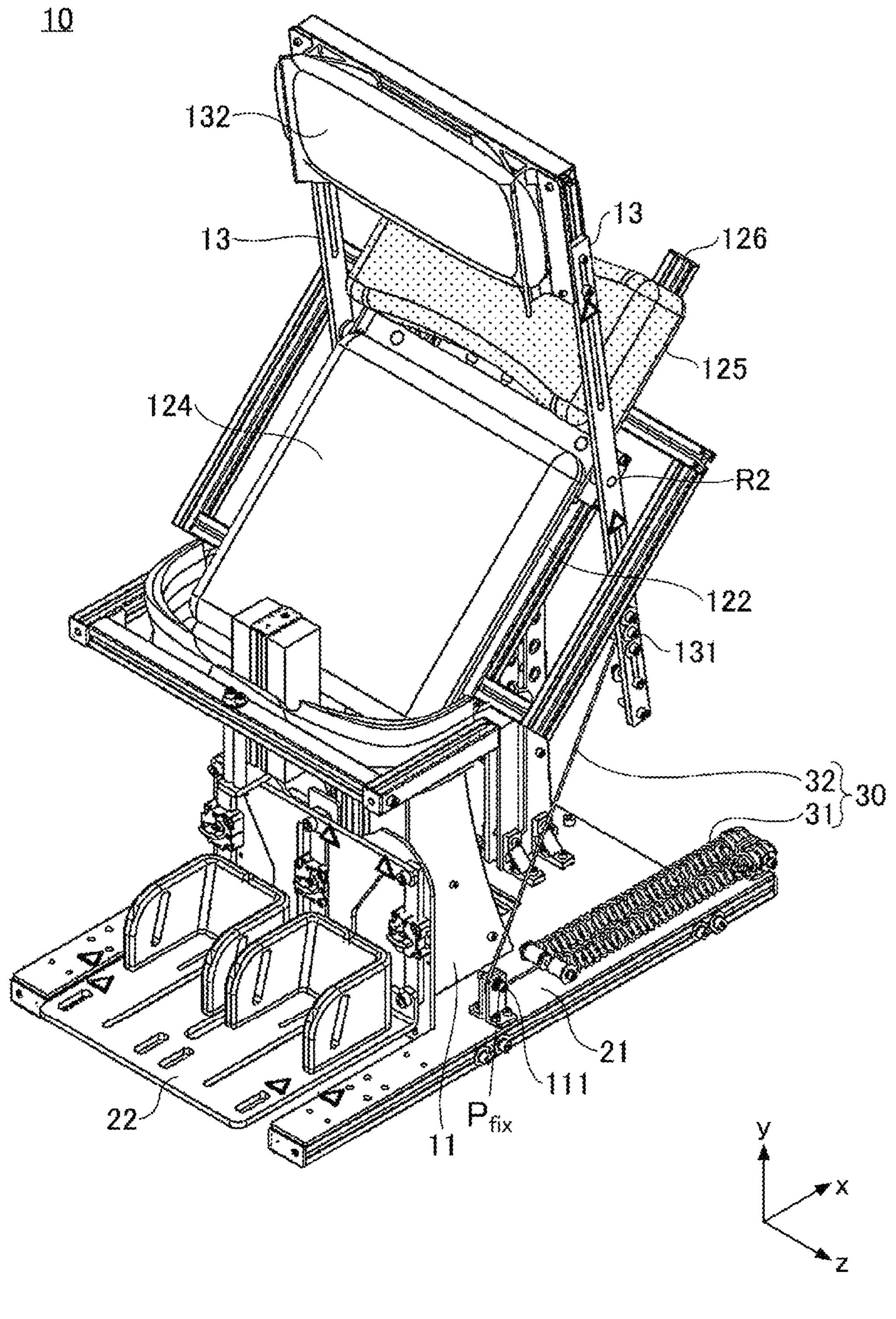
FIG. 4 is a perspective view in the middle of posture change of the assistance device of the first embodiment.

FIG. 3 is a side view in the middle of posture change of the assistance device 10 of the embodiment, and FIG. 4 is a perspective view in the middle of posture change of the assistance device 10. When transitioning from the sitting position to the standing position in FIGS. 1 and 2, the second link 12 rotates counterclockwise about the rotation center R1, and rises from a position substantially horizontal to the base 21 toward a normal direction. On the other hand, the third link 13 rotates counterclockwise about the rotation center R2 along with a forward tilting motion of the upper body serving as a trigger of the standing-up and sitting-down motion, and is tilted forward (−x direction) from the normal direction.

As illustrated in FIG. 3, accompanying the rise of the second link 12, the position of the third link 13 also moves obliquely upward. Accompanying the movement of the third link 13, the wire 32 of the elastic connection portion unit 30 is pulled, and the spring 31 extends in the −x direction. The force of pulling the spring 31 in the −x direction mainly depends on the extension of the knee of the user and the change in the load accompanying the change in the upper body posture. The elastic connection portion unit 30 coupled between the third link 13 and the fixed position Pfix on the first link 11 or in the vicinity of the first link 11 can control the rotation of the third link 13 independently of the assistance force to the knee joint by the passive actuator 14.

The spring 31 extends accompanying the standing-up motion of the user, and a moment of pulling back, to the +x direction, the third link tilting forward in the −x direction is generated. By loosening the fixed position on the third link of the wire 32 and the tension of the wire 32 and adjusting the restoring force of the spring 31, it is possible to slow the rotation speed of the third link 13 or make the rotation speed of the third link 13 slower than the rotation timing of the second link.

Figure 5:
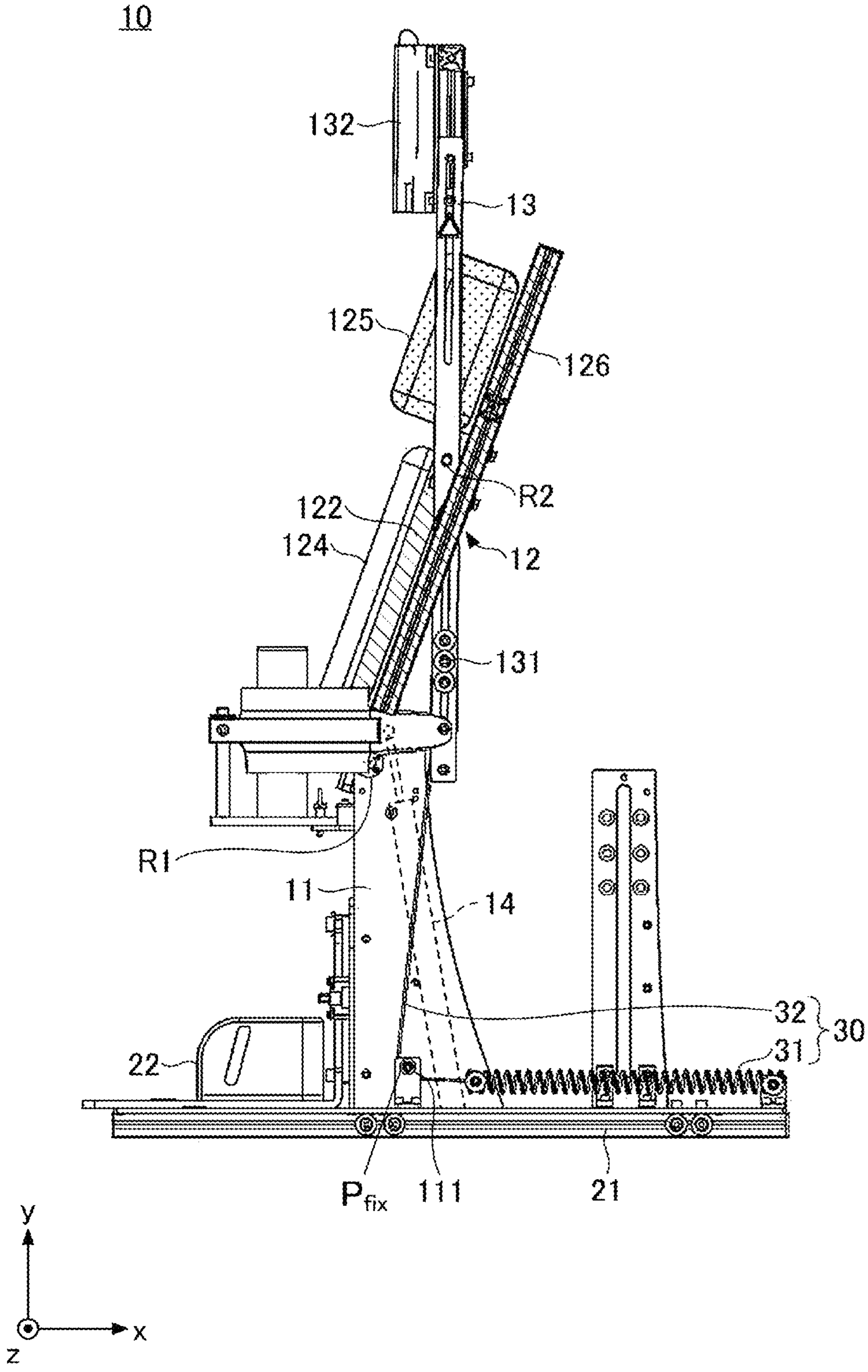
FIG. 5 is a side view of a standing position state of the assistance device of the first embodiment.
Figure 6:
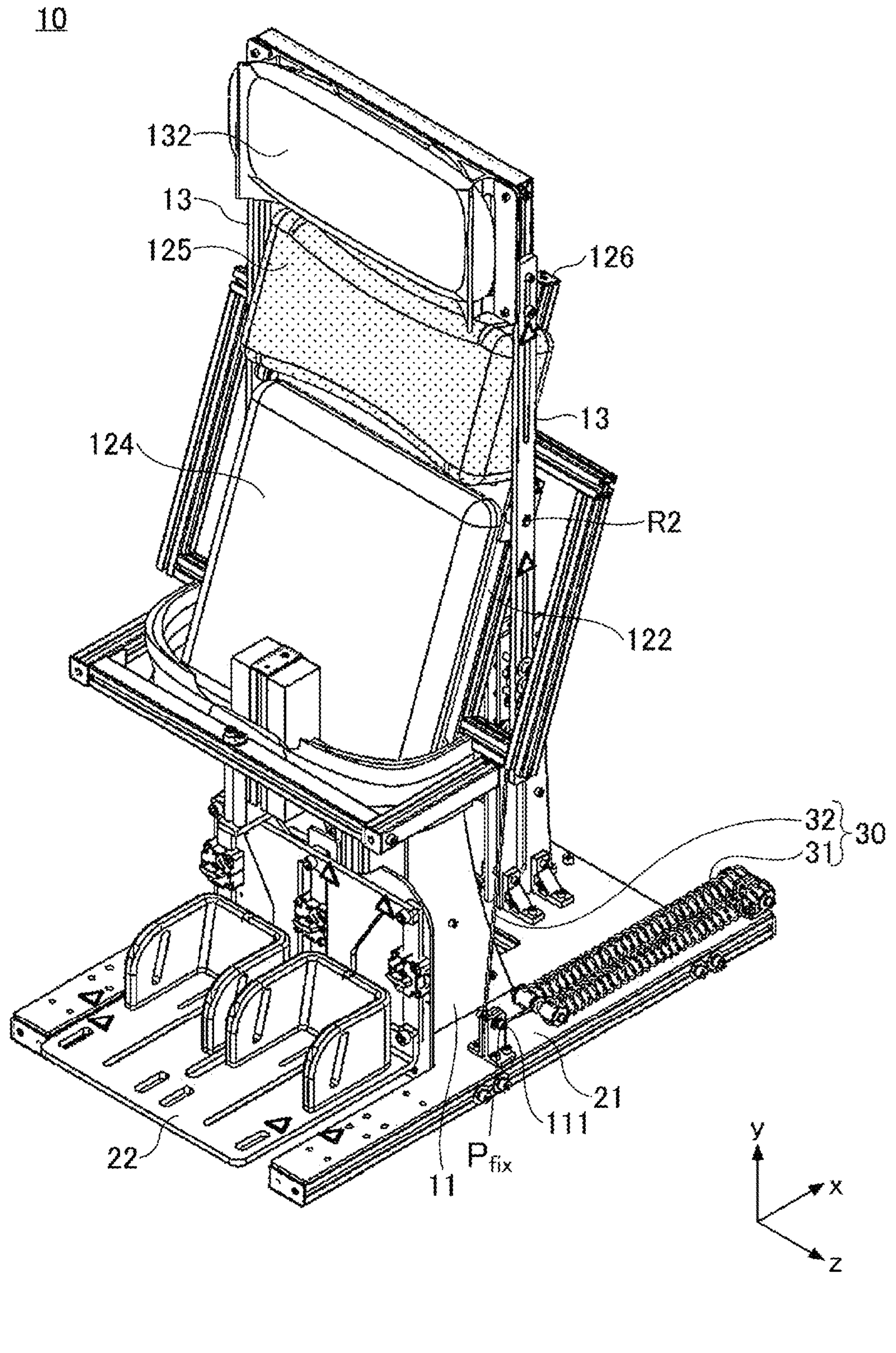
FIG. 6 is a perspective view of the standing position state of the assistance device of the first embodiment.

FIG. 5 is a side view of a standing position state the assistance device 10 of the embodiment, and FIG. 6 is a perspective view of a standing position state of the assistance device 10. In the standing position state, the second link 12 rises at an angle close to perpendicular, an angle of about 80°±10°. This angle range of the second link 12 in the standing position state corresponds to the angle of the knee joint of the user. This is because the knee joint does not need to be completely extended to 90° when the user is standing up, and bending to about 80°±10° is sufficient for a standing position posture as a guide of a range in which the knee is not excessively extended.

The third link 13 tilts forward once in the −x direction in the middle of posture transition, but returns to a state substantially perpendicular to the base 21 in the standing-up state by the restoring force of the spring 31. The height position in the y direction of the third link 13 at this time becomes the highest, and the spring 31 extends to the maximum. In order to efficiently use the restoring force of the spring 31, it is desirable that the fixed position Pfix of the elastic connection portion 30 is located nearer than the third link 13, that is, more toward the −x side than the third link 13 in the standing position state.

When in the standing position state, the extension portion 126 of the second link 12 supports the buttocks of the user. The extension portion 126 is provided with the lumbar support pillow 125 for a comfortable usability. The buttocks are supported by the extension portion 126 in relation to the length of the seating surface 122 and the body height of the user. Providing the extension portion 126 stably maintains the standing up motion of the user and the posture during standing up. The extension portion 126 of the second link 12 is always positioned at the rear relative to the third link 13 regardless of the posture change of the assistance device 10, and does not interfere with the change motion between the sitting position and the standing position. The seating surface 122 and the extension portion 126 constituting the second link 12 may be integrally molded.

Figure 7A:
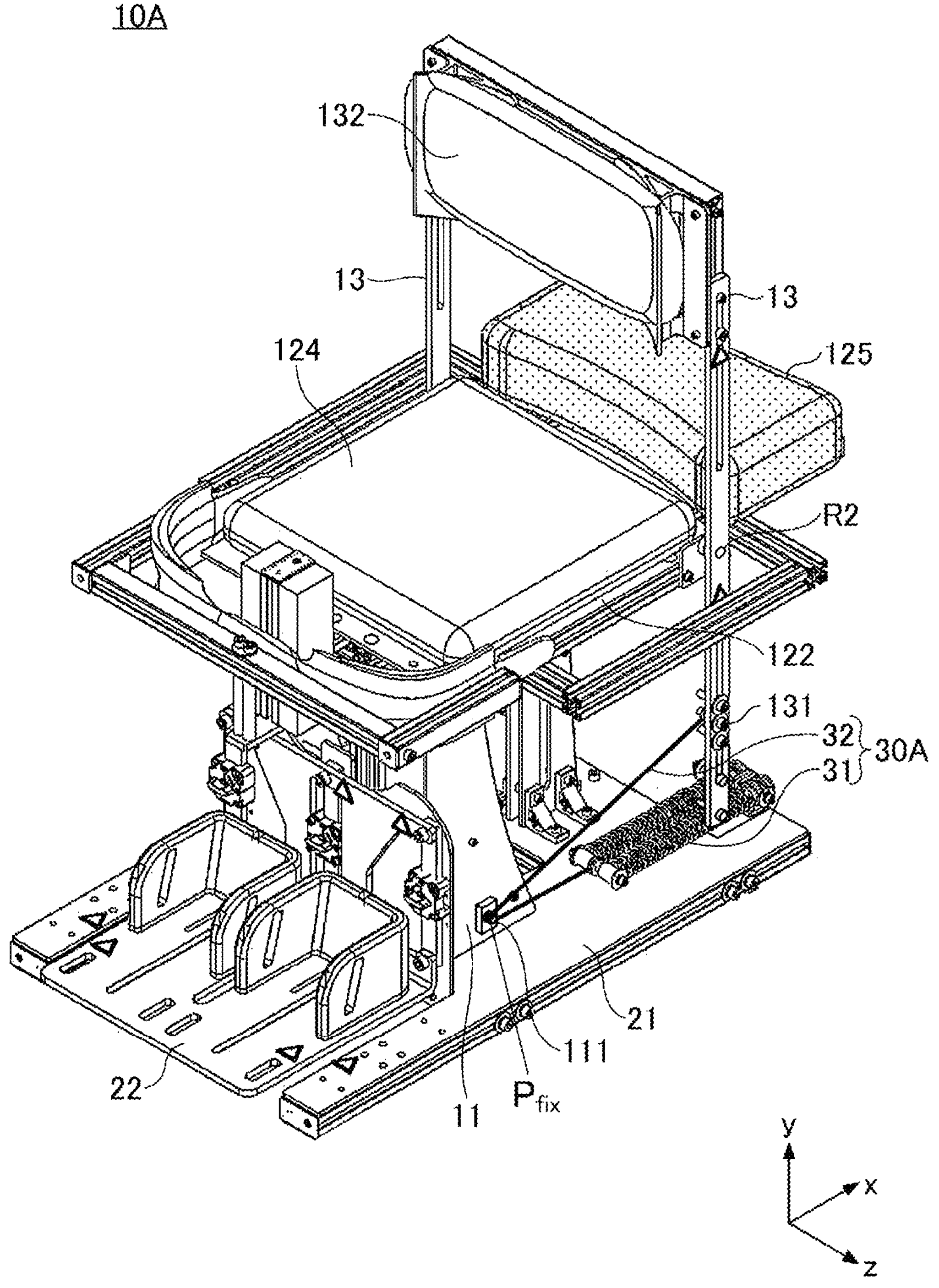
FIG. 7A is a view illustrating another configuration example of coupling using an elastic connection portion.
Figure 7B:
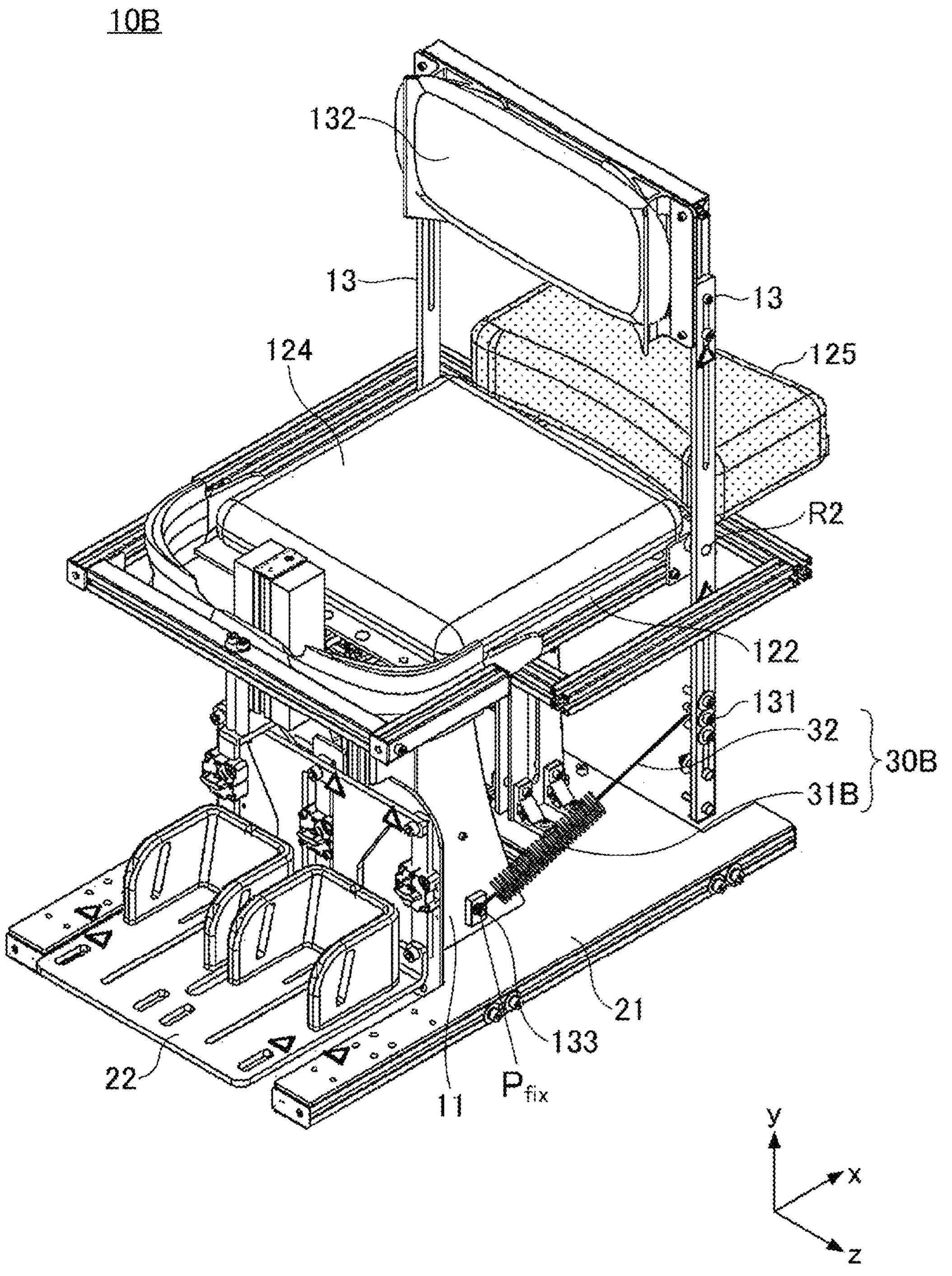
FIG. 7B is a view illustrating still another configuration example of coupling using the elastic connection portion.
Figure 7C:
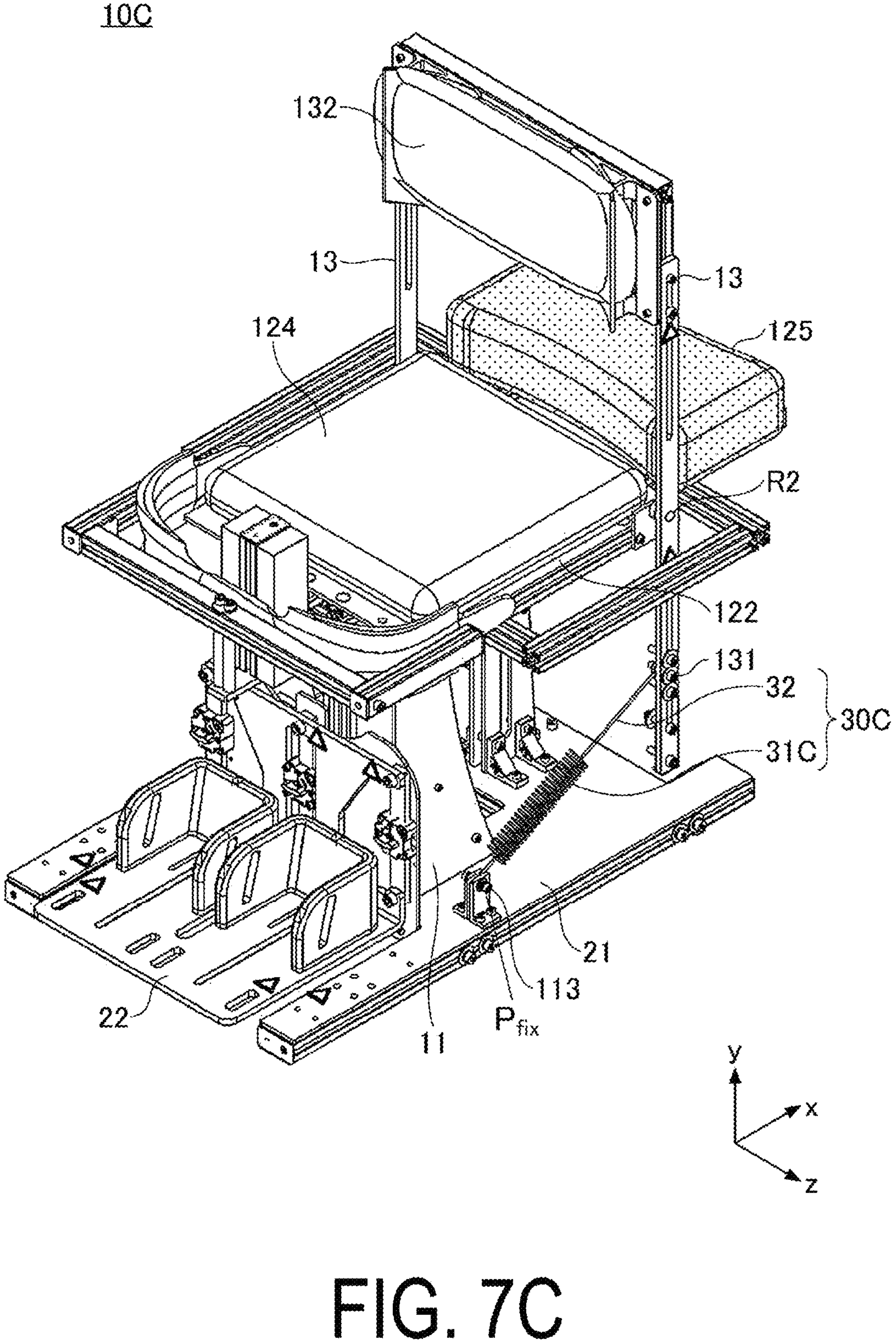
FIG. 7C is a view illustrating still another configuration example of coupling using the elastic connection portion.

FIGS. 7A to 7C illustrate another coupling example using the elastic connection portion 30. In an assistance device 10A of FIG. 7A, the fixed position Pfix is provided on the first link 11. One end of the wire 32 of an elastic connection portion unit 30A is coupled to the coupling point 131 on the third link 13, and the other end is connected to the spring 31 through the pulley 111 fixed to the first link 11. The spring 31 is fixed to the rear end of the base 21. The elastic connection portion 30A is coupled between the third link 13 and the first link 11 and controls the rotation of the third link 13. The action of the elastic connection portion 30A at the time of posture change of the assistance device 10A is as described with reference to FIGS. 1 to 6.

In an assistance device 10B of FIG. 7B, the fixed position Pfix is provided on the first link 11. One end of the wire 32 of an elastic connection portion unit 30B is coupled to the coupling point 131 on the third link 13, and the other end is connected to a spring 31B. The spring 31B is fixed to a hook 113 on the first link 11 on a side opposite to a connection portion with the wire 32. The elastic connection portion 30B is coupled between the third link 13 and the first link 11 and controls the rotation of the third link 13. The action of the elastic connection portion 30B at the time of posture change of the assistance device 10B is as described with reference to FIGS. 1 to 6.

In an assistance device 10C of FIG. 7C, the fixed position Pfix is provided on the base 21 in the vicinity of the first link 11. One end of the wire 32 of an elastic connection portion unit 30C is coupled to the coupling point 131 on the third link 13, and the other end is connected to a spring 31C. The spring 31C is fixed to the hook 113 on the base 21 on a side opposite to the connection portion with the wire 32. The elastic connection portion 30C is coupled between the third link 13 and the base 21 and controls the rotation of the third link 13. The action of the elastic connection portion 30C at the time of posture change of the assistance device 10C is as described with reference to FIGS. 1 to 6.

Figure 8:
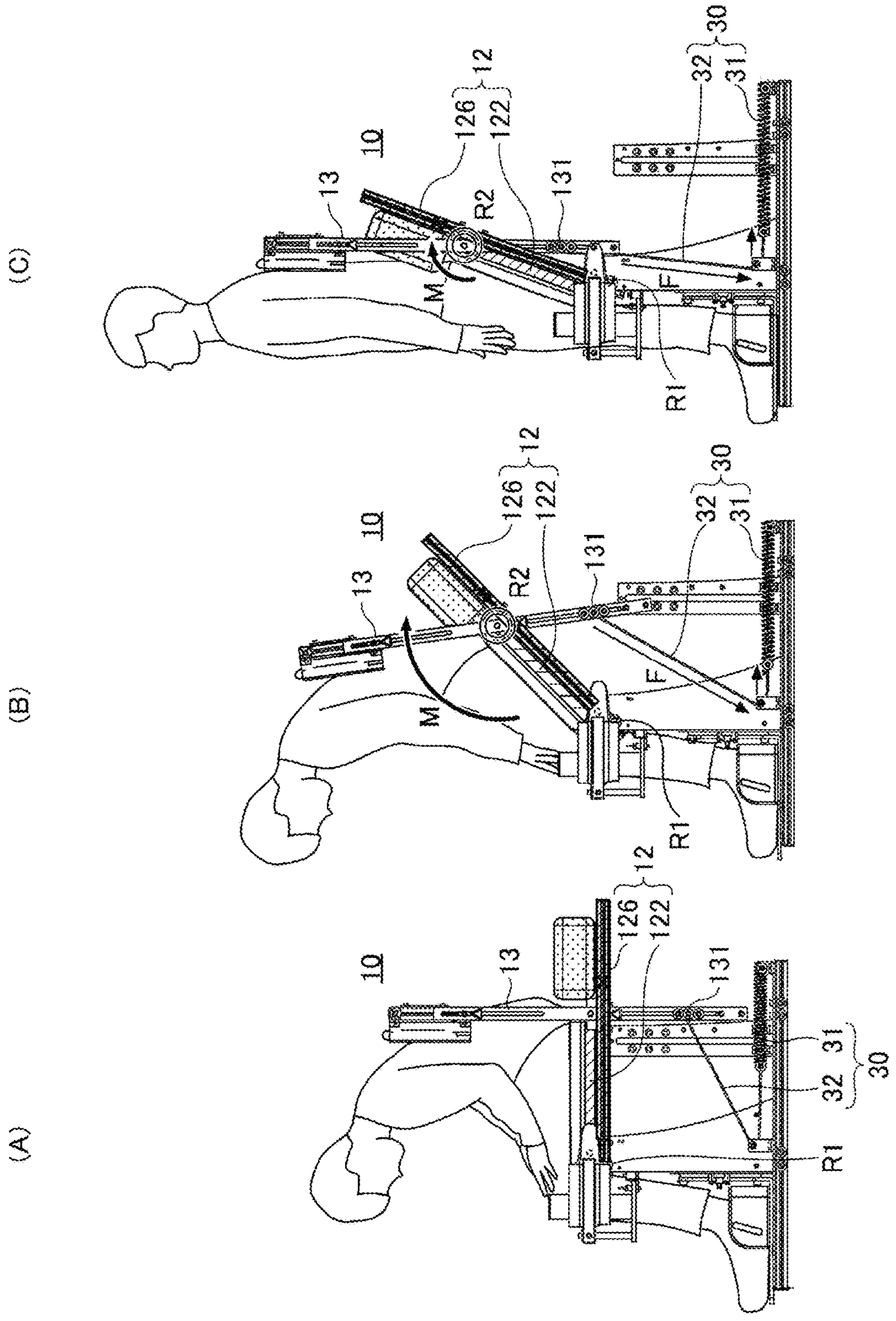
FIG. 8 is a view illustrating a basic motion of the assistance device of the first embodiment.

FIG. 8 is a view illustrating a basic motion example of the assistance device 10 of the embodiment. In (A) of FIG. 8, the user is about to stand up. At this time point, the spring 31 of the elastic connection portion 30 is in an initial position. When the user stands up, the upper body tilts forward, the load applied to the rotation center R1 decreases, and the assistance amount by the passive actuator 14 goes beyond, and therefore, the second link 12 rotates counterclockwise with respect to the rotation center R1 of the assistance device 10. This counterclockwise force rotates the second link 12 counterclockwise. Due to the change of the load with respect to the rotation center R1, the passive actuator 14 (see FIG. 1) operates to assist the counterclockwise rotation.

In (B) of FIG. 8, in the process of reaching the standing up posture, the knee of the user is extending from the bent state, but the upper body is still tilted forward. When the third link moves obliquely upward, the spring 31 coupled to the third link 13 extends due to the load corresponding to the extension of the knee and the upper body posture of the user. When the spring 31 extends, a clockwise moment M that tilts rearward the forward tilted upper body is generated by a restoring force F of the spring 31. In general, it is difficult for a user whose upper body or body trunk function is weak to return the posture from a forward tilt state due to the unstable upper body in the middle of a posture transition and the momentum by the posture transition, but the user can stand up while raising the upper body by the clockwise moment M by the restoring force of the spring 31.

Since the actual knee joint position of the user and the rotation center R1 of the assistance device 10 are apart from each other by a certain distance, the position of the buttocks of the user is being shifted from the initial position on the seating surface 122 toward the rear end of the seating surface 122 in the process of standing up. Due to the extension portion 126 extending rearward of the seating surface 122 of the second link 12, the buttocks can be stably supported even if the position of the buttocks of the user who is standing up is shifted toward the rear end of the seating surface.

In (C) of FIG. 8, in the standing up posture, the spring 31 extends to the maximum. The upper body is supported by the clockwise moment M due to the restoring force of the spring 31. The lower limb posture is supported by the counter-clockwise moment of the second link 12, and the standing up posture of the user is maintained. Even a user having a weak upper body or body trunk function has a stable standing up posture by the restoring force of the spring 31 acting on the third link.

Figure 9:
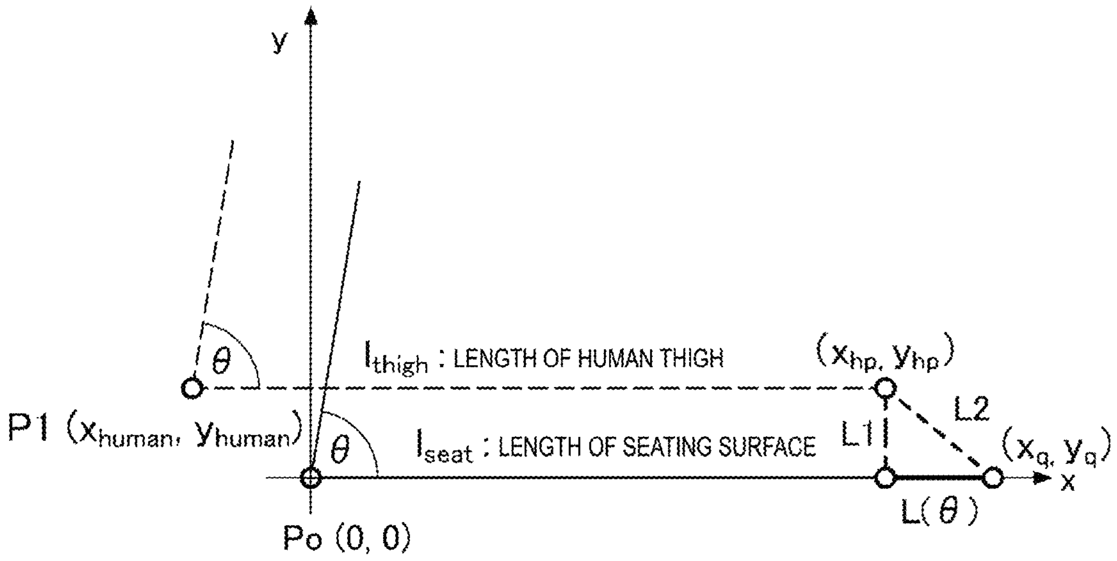
FIG. 9 is an explanatory view of a length necessary for an extension portion of a second link.
Figure 10:
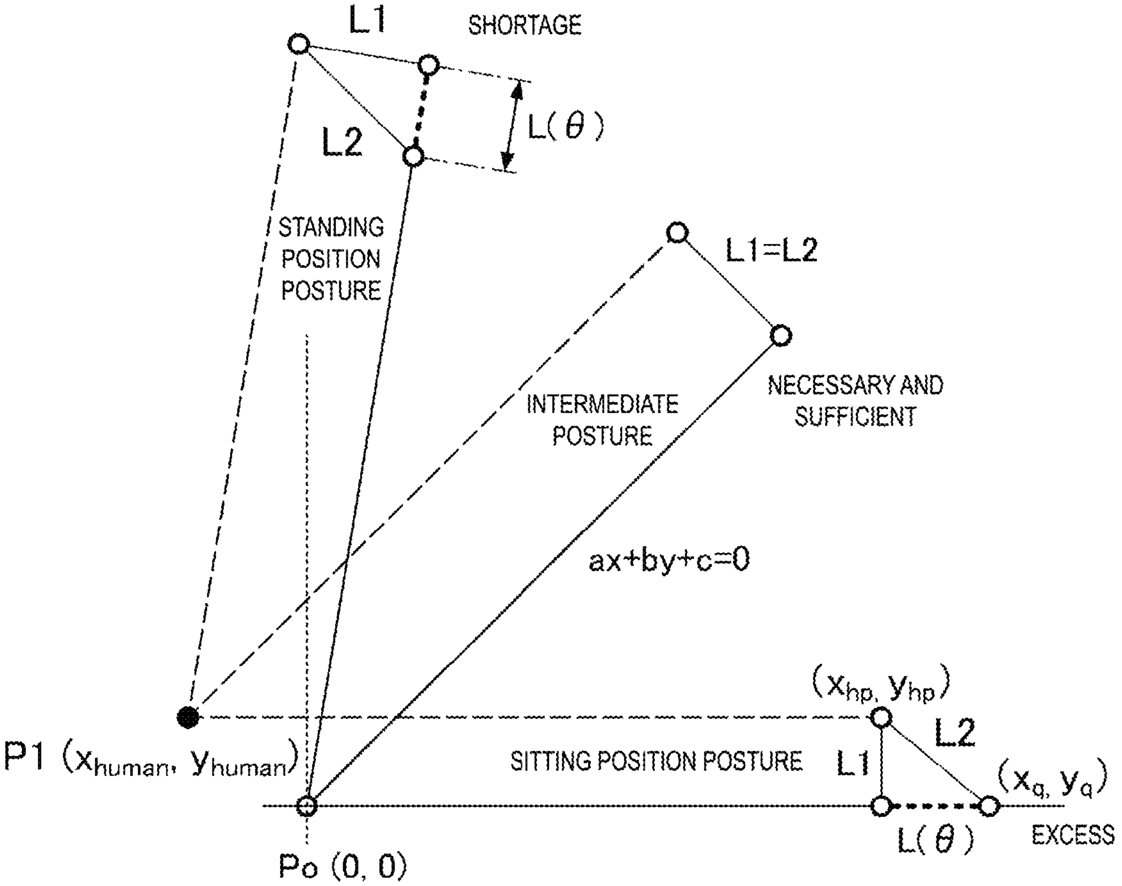
FIG. 10 is an explanatory view of the length necessary for the extension portion of the second link.
Figure 11:
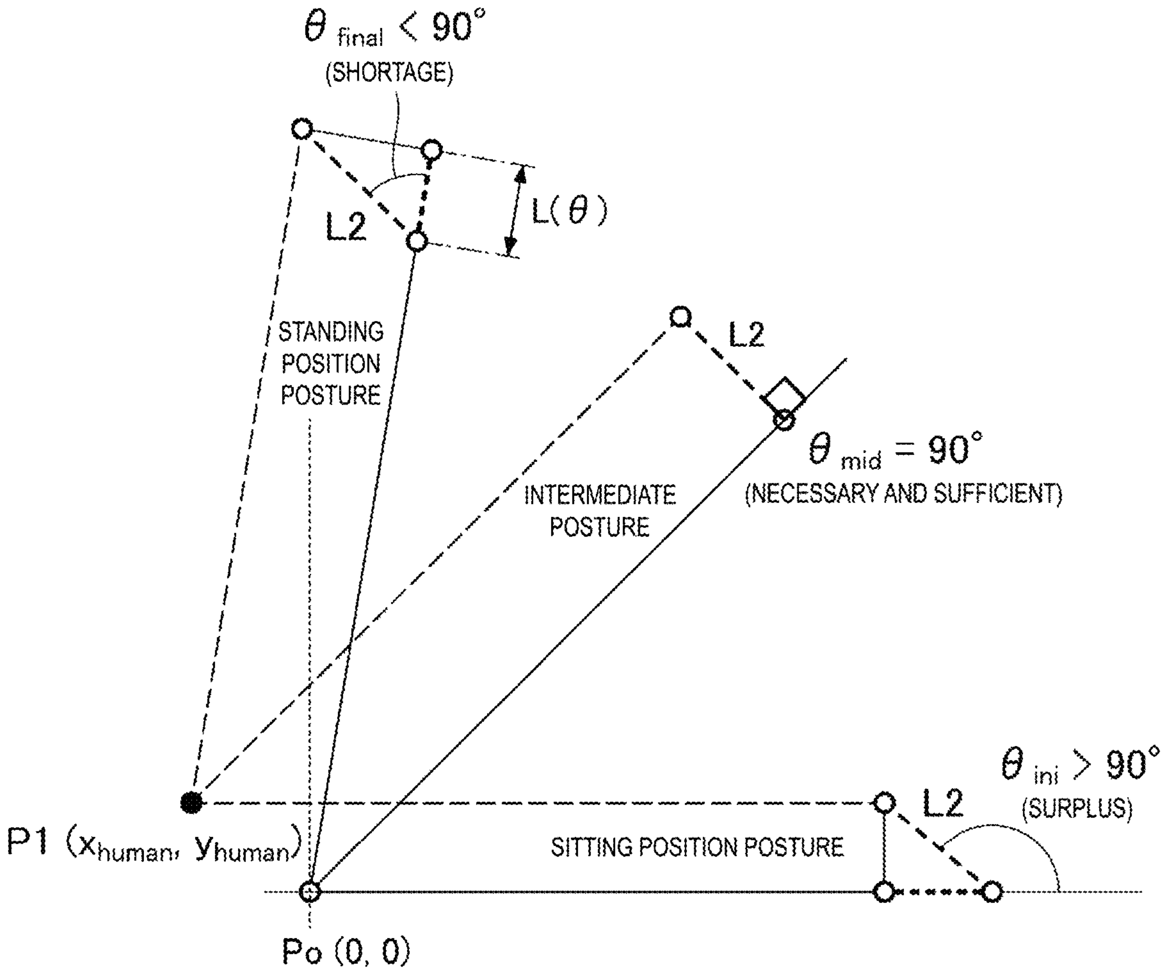
FIG. 11 is an explanatory view of the length necessary for the extension portion of the second link.

FIGS. 9 to 11 are views explaining the length of the extension portion 126 of the second link 12 required to support the buttocks of the user. As described above, the rotation center R1 of the assistance device 10 and the actual position of the knee joint of the user are apart from each other to some extent. In the xy plane (sagittal plane), the rotation center R1 of the assistance device 10 is set to an origin Po (0, 0). It is assumed that the coordinate position of the knee joint rotation center of the user is P1 ($x_{human}$, $y_{human}$), and the position does not always change during the standing-up and sitting-down motion. Let the angle of the knee joint at the time of standing up and sitting down be θ (0°≤θ≤80°). The knee joint angle θ is 0° in the sitting position, and the knee joint angle in the standing position is 80°.

The hip joint position of the user in the xy plane is ($x_{hp}$, $y_{hp}$), and the hip joint position of the assistance device 10 is defined as ($x_q$, $y_q$). The length of the thigh of the user is $l_{thigh}$, and the length in the x direction (front-rear direction) of the seating surface 122 of the assistance device 10 is $l_{seat}$. Let the shortest distance between the seating surface 122 and the thigh in the xy plane be L1, and the distance between the hip joint position of the user and the hip joint position of the assistance device 10 be L2. L(θ) is a length required for the extension portion 126 of the second link 12.

As in FIG. 10, the length L(θ) necessary for the extension portion 126 behaves so as to increase with standing up. In the sitting position, the buttocks (hip joint) of the user fall within the seating surface 122, and the length L(θ) becomes an extra length. In an intermediate posture on the way to the standing position, the hip joint position of the user is shifted to the rear of the seating surface 122, and the hip joint position ($x_{hp}$, $y_{hp}$) of the user and the hip joint position ($x_q$, $y_q$) of the assistance device 10 coincide at a certain time point of time, and L1=L2 is established. L(θ) at this time is 0, which is a necessary and sufficient length.

When the assistance device 10 is in the standing position, the hip joint position of the user exceeds the seating surface 122, and the length of the seating surface 122 runs short by L(θ). L(θ) of this shortage is the length necessary for the extension portion 126 of the second link 12. The extension portion 126 is positioned at the rear (x side) relative to the third link 13 in the entire process from the sitting position to the standing position.

Let a line segment representing the tilt of the seating surface 122 in the xy plane be ax+by+c=0. A distance Ld(θ) from a discretionary point (x1, y1) on the line segment ax+by+c=0 to a line segment parallel to this line segment is expressed by the following Mathematical Expression (1).

[Math. 1]

$$L_d(\theta) = \frac{|ax_1 + by_1 + c|}{\sqrt{a^2 + b^2}} \quad (1)$$

Here, Ld(θ) corresponds to L1 in FIGS. 9 and 10.

Assuming that the knee joint position (P1) of the human is apart from the knee joint of the assistance device 10, that is, the origin Po (0, 0) by ($x_{human}$, $y_{human}$), the knee joint angle θ is $\tan\theta=(y-y_{human})/(x-x_{human})$, and therefore, Mathematical Expression (2) is obtained.

[Math. 2]

$$(y - y_{human}) = \tan\theta(x - x_{human}) \quad (2)$$
$$y - \tan\theta\cdot x + (-y_{humna} + \tan\theta\cdot x_{human}) = 0$$

When Mathematical Expression (2) is applied to the mathematical expression ax+by +c=0 representing a straight line, a=−tan θ, b=1, and c=($-y_{human}$+tan θ·$x_{human}$) are established.

When the coordinates Po (0, 0) of the origin and the a, b, and c are substituted into Mathematical Expression (1) for obtaining a distance between two straight lines, the distance between the straight lines is obtained by Mathematical Expression (3).

[Math. 3]

$$L_d(\theta) = \frac{|c|}{\sqrt{a^2 + b^2}} = \frac{|(-y_{humna} + \tan\theta\cdot x_{human})|}{\sqrt{1^2 + \tan\theta^2}} \quad (3)$$

Ld(θ) in Mathematical Expression (3) corresponds to L1 in FIGS. 9 and 10.

Next, a distance Lp between the hip joint position ($x_{hp}$, $y_{hp}$) of the user and the hip joint position ($x_q$, $y_q$) of the assistance device 10 in the xy plane is obtained. The distance Lp corresponds to L2 in FIGS. 9 and 10. Lp is obtained by Mathematical Expression (4).

[Math. 4]

$$L_p = \sqrt{(x_{hp} - x_q)^2 + (y_{hp} - y_q)^2} \quad (4)$$

A right triangle is formed by the calculated Ld(θ), that is, L1, Lp, that is, L2, and the distance L(θ) to be obtained. From the Pythagorean theorem, the distance L(θ) to be obtained is expressed by Mathematical Expression (5).

[Math. 5]

$$L(\theta) = \sqrt{L_p^2 - L_d(\theta)^2} \quad (5)$$

Calculating L(θ) as it is always results in a positive sign, and it cannot be judged only by the calculation value whether the length of the seating surface 122 is surplus or short. However, as described with reference to FIG. 10, since the length necessary for the second link 12 becomes longer as the seating surface 122 rises, estimation from the initial position is possible.

With reference to FIG. 11, it is possible to calculate surplus or shortage by whether the angle formed by the straight line indicating the distance L2 between the hip joint position ($x_{hp}$, $y_{hp}$) of the user and the hip joint position ($x_q$, $y_q$) of the assistance device 10 and the extension line of the seating surface 122 is larger or smaller than 90°.

Figure 12:
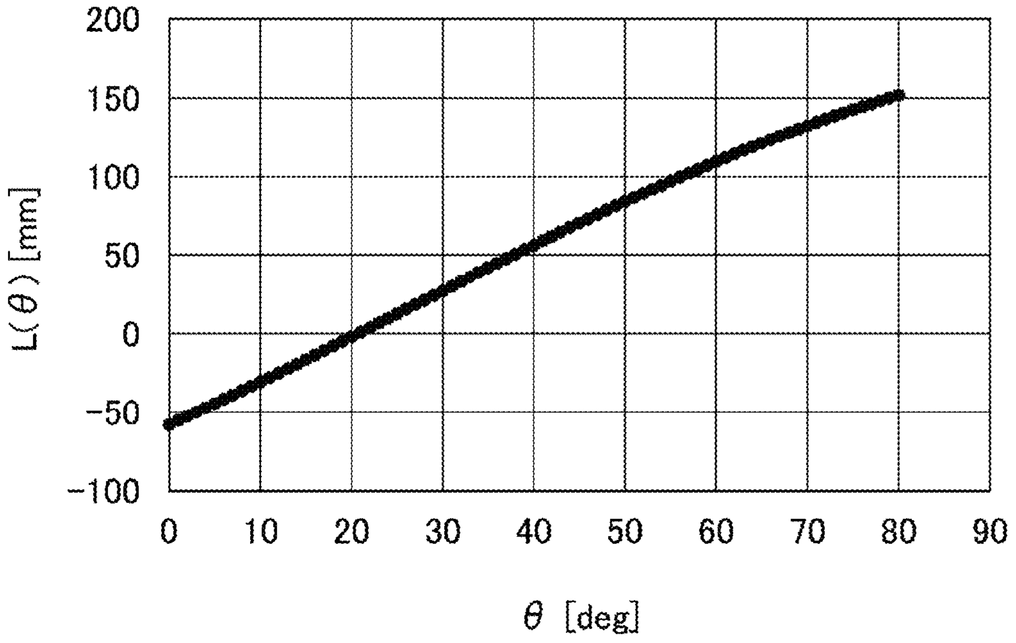
FIG. 12 is a view showing a calculation result of the length necessary for the extension portion of the second link.

FIG. 12 shows a calculation result of L(θ) based on Mathematical Expression (5). As an example, calculation is performed on an assumption that the length $l_{thigh}$ of the thigh of the user is 467 mm (assuming an extension of 190 cm), the length $l_{seat}$ of the seating surface 122 is 450 mm, and the position ($x_{human}$, $y_{human}$) of the knee joint of the user with respect to the origin Po is (−75 mm, 150 mm).

In FIG. 12, the horizontal axis represents the angle (θ) of the knee joint, and the vertical axis represents the length L(θ) required for the extension portion 126. As described above, as the angle of the knee joint increases, that is, as the knee is extended, the necessary length L(θ) increases, and a length of 152 mm is required in a standing up position (θ=80°). This is 33.8% of the length $l_{seat}$ (450 mm) of the seating surface 122. In consideration of a variation in the user's body shape, that is, the position of the knee, the length of the extension portion 126 is appropriately 30% to 35% of the length in the front-rear direction of the seating surface 122. Based on this relationship, the seating surface 122 and the extension portion 126 may be integrally molded.

Application to Moving Device

Figure 13A:
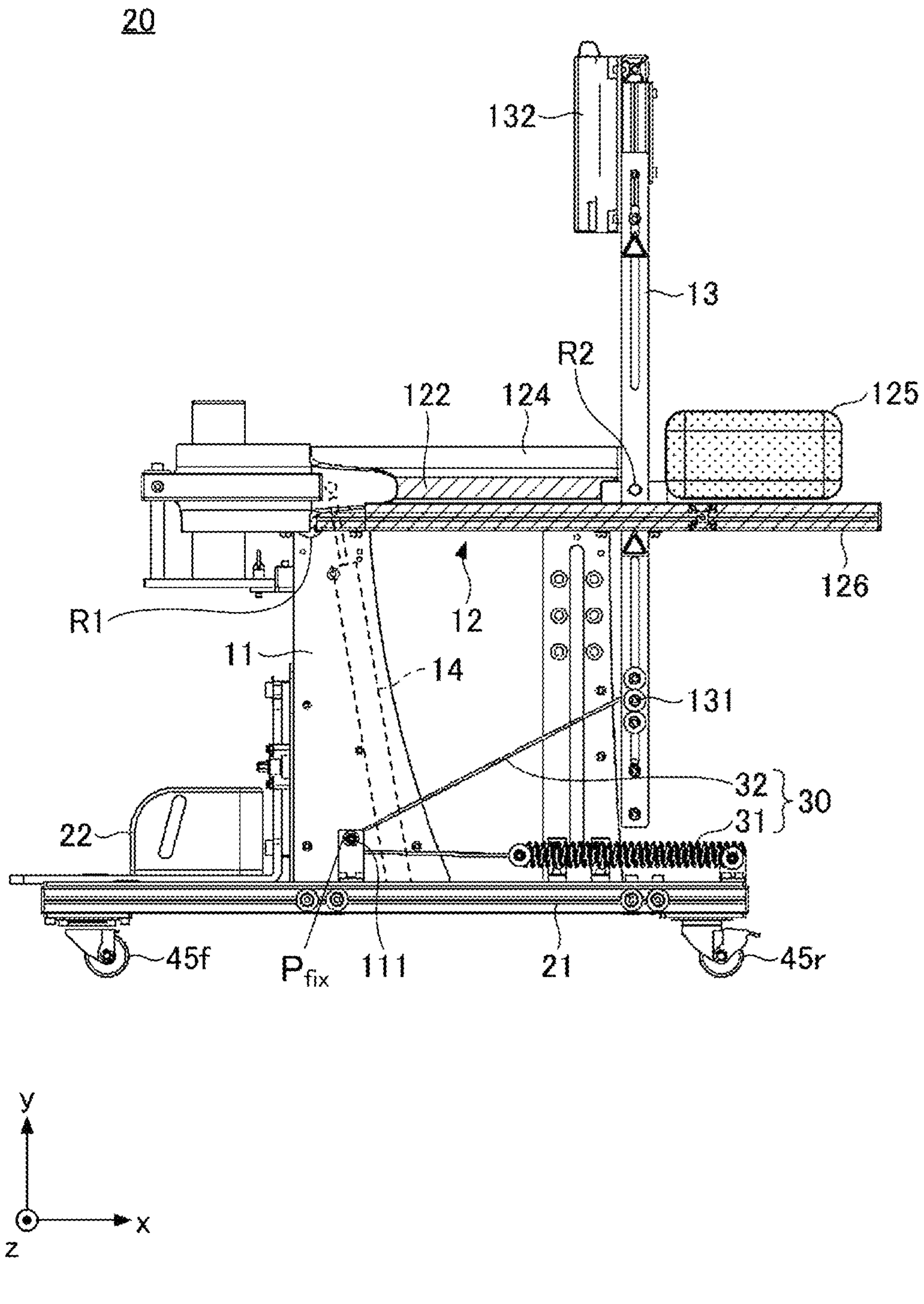
FIG. 13A is a side view of a sitting position state of a moving device using the assistance device of the first embodiment.
Figure 13B:
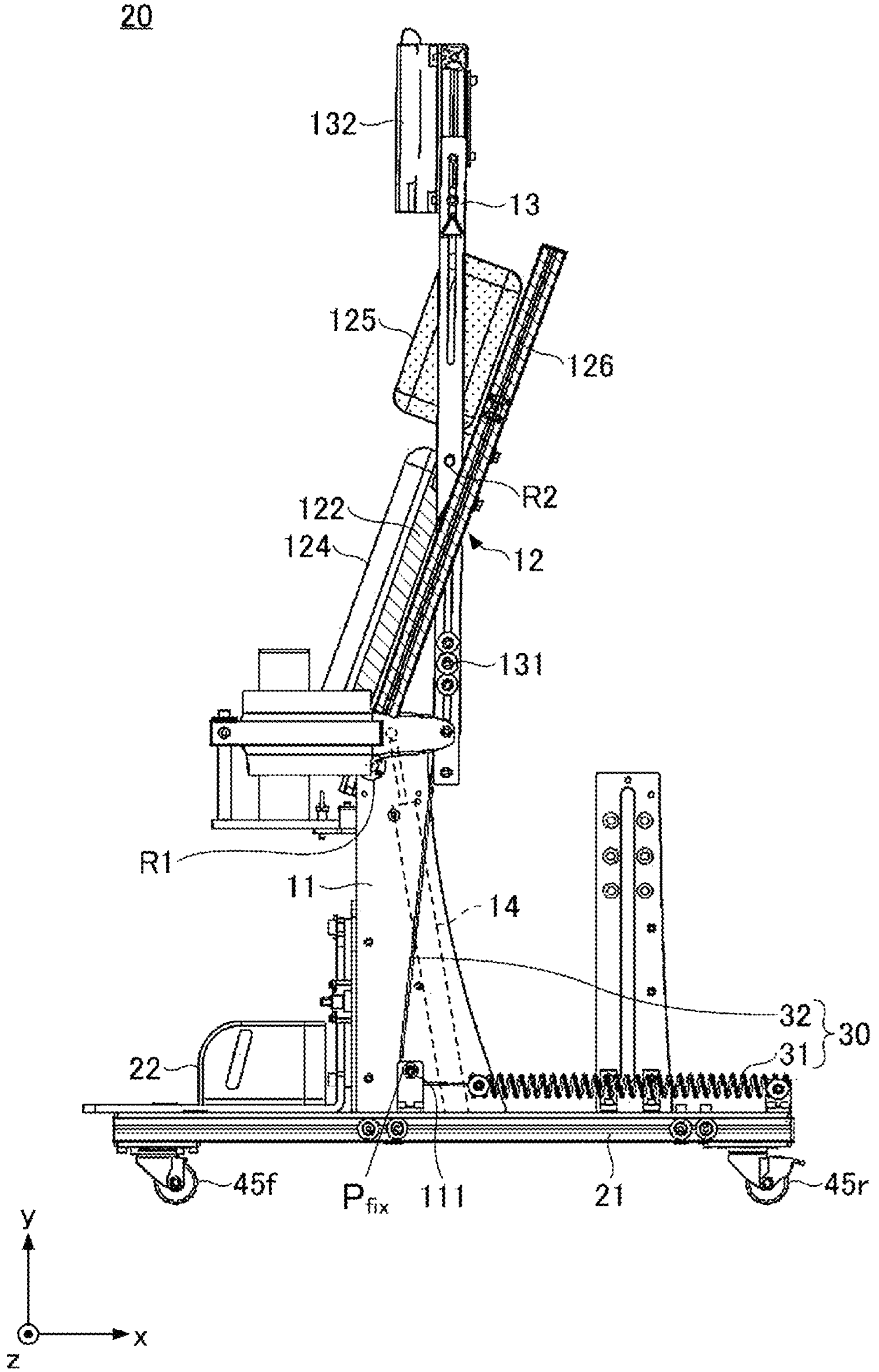
FIG. 13B is a side view of a standing position state of the moving device using the assistance device of the first embodiment.

FIG. 13A is a side view of the sitting position upper body of a moving device 20 using the assistance device 10, and FIG. 13B is a side view of the standing position state of the moving device using the assistance device 10. The configuration itself of the assistance device 10 is the same as that illustrated in FIGS. 1 to 6. The moving device 20 includes casters **45*f* and 45*r* attached to the base 21 of the assistance device 10. The caster 45*f* may be attached to a corner on a front side of the base 21, and the caster 45*r* may be attached to a corner on a rear side of the base 21. One front caster 45*f* may be provided at a center part of a front end of the base 21. In place of the casters 45*f* and 45*r*, wheels of an electric wheelchair and a drive control device may be combined with the assistance device 10**. Regardless of the type of the wheels for movement, customization may be performed in accordance with a moving environment, a use scene, and the like.

It is considered that the moving device 20 often performs posture change between the sitting position and the standing position while the moving device 20 is stopped. The moving device 20 may be provided with a stopper and thus the user can safely sit down or stand up, or may be attached with a caster having a stopper function. The action of the elastic connection portion part 30 at the time of posture change between the sitting position and the standing position is the same as that of the assistance device 10. The moving device 20 can be used as a wheelchair that also serves as rehabilitation equipment in a hospital facility, an office, or at home, and can also be used as a chair at the time of work.

While the configurations of the assistance device 10 and the moving device 20 using the same have been described above based on specific configuration examples, the assistance device 10 and the moving device 20 are not limited to the above-described configuration examples. The elastic connection portion 30 needs not necessarily a combination of a spring and a wire. Coupling may be performed only by a spring without using a wire, or not only a coil spring but also an elastic body such as an elastic belt or a rubber spring may be used as a spring. When an adjustment member such as a wire, a string, or a link with an elongated hole is used in combination with an elastic body such as a spring, the assistance amount and timing may be varied by adjusting tension of the wire or the like or adjusting a spring coupling position in the elongated hole. Use of these adjustment members enables the distance between the coupling point 131 and the spring 31 to be adjusted as necessary.

When the spring 31 is coupled to the third link 13 via the wire 32 by the elastic connection portion unit 30, the timing at which the assistance force acts on the torso of the user can be adjusted by adjusting slack of the wire 32. The distance from the rotation center R2 of the third link 13 to the coupling point 131 is adjusted by adjusting the position of the coupling point 131 to the third link 13 of the elastic connection portion unit 30 using a link with an elongated hole or the like, and the strength of the assistance force to the torso can be increased or decreased. The third link 13 is provided with a plurality of fixtures to be the coupling points 131, and a desired fixture is made selectable in accordance with the age, extension, weight, physical characteristics, and the like of the user, whereby the position of the coupling point 131 may be adjustable or may be finely adjustable in a stepless manner using a slide lock mechanism or the like.

Also in a case of giving these additional functions, it is possible to independently control the assistance for the bending and stretching motion of the knee of the user and the assistance for the upper body. The assistance moment for the torso of the user is generated at an appropriate timing during the motion of standing up or sitting down, and the upper body can be stably supported also for a user having a weak upper body or body trunk function.

The assistance device 10 alone is used as a device for rehabilitation of standing up and sitting down, and can be installed on a floor surface of a home, a rehabilitation facility, a hospital, or the like. It can also be used as a work assistance device in a factory facility that frequently takes a sitting position, a standing position, and an intermediate posture thereof. Use of the elastic connection portion 30 having a simple configuration can stably support the user through before and after of the posture transition without power supply.

Second Embodiment

In the first embodiment, the posture transition of the user is stably assisted by independently assisting and controlling the bending and stretching motion of the knee and the upper body posture of the user using the restoring force of the elastic connection portion 30 coupled between the fixed position Pfix on the first link 11 or the base 21 and the third link 13. Depending on the physical function of the user, the degree of the remaining body trunk ability, and the posture of the user during posture transition, there can be a case where it becomes difficult to return the upper body forward after tilting the upper body rearward for posture transition from the standing position to the sitting position. Therefore, in the second embodiment, by limiting the range of the clockwise rotation angle of the third link 13 (i.e., the backrest 132) with respect to the second link 12, excessive rearward tilt of the upper body is suppressed.

Figure 14A:
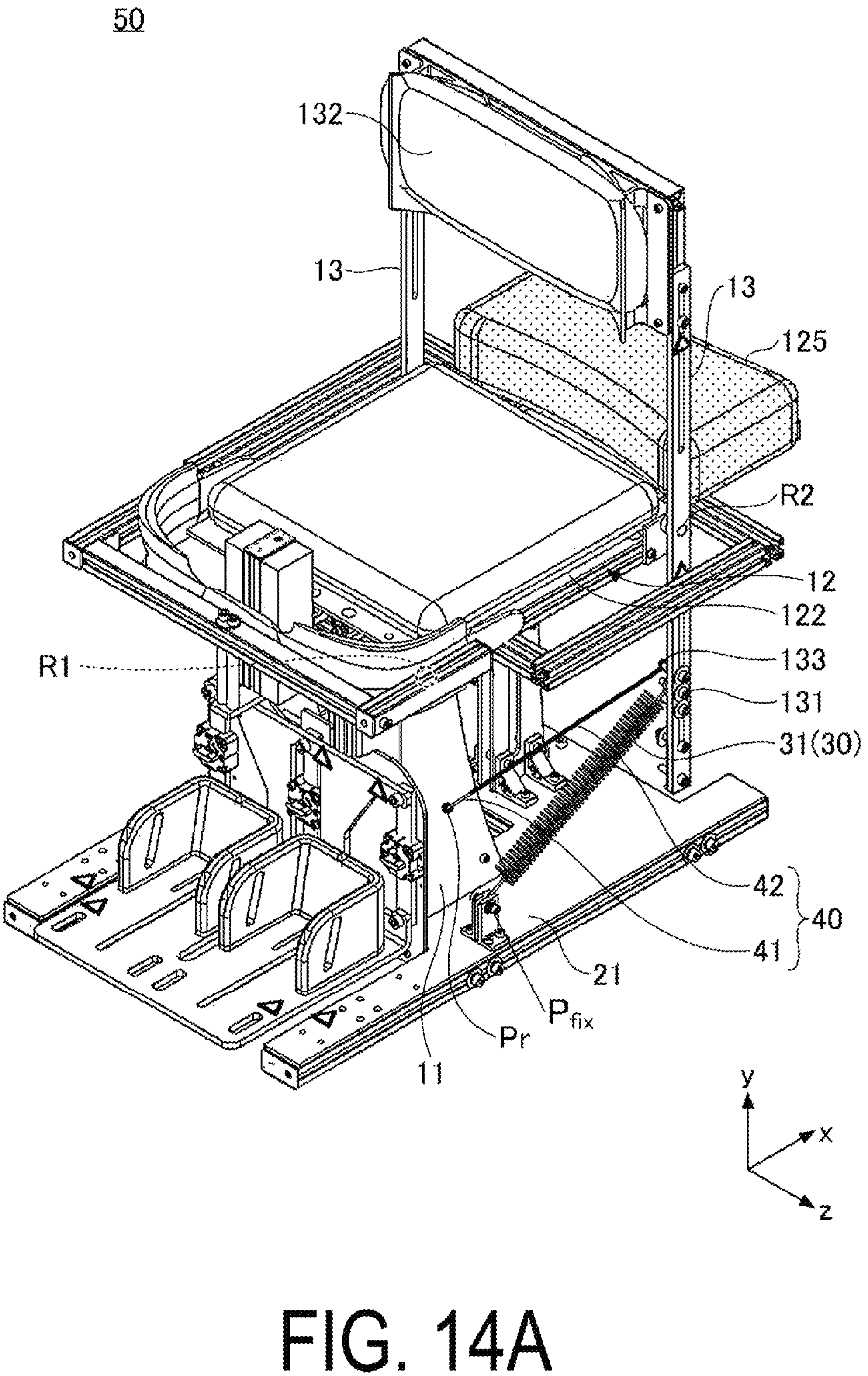
FIG. 14A is a perspective view of a sitting position state of an assistance device of a second embodiment.
Figure 14B:
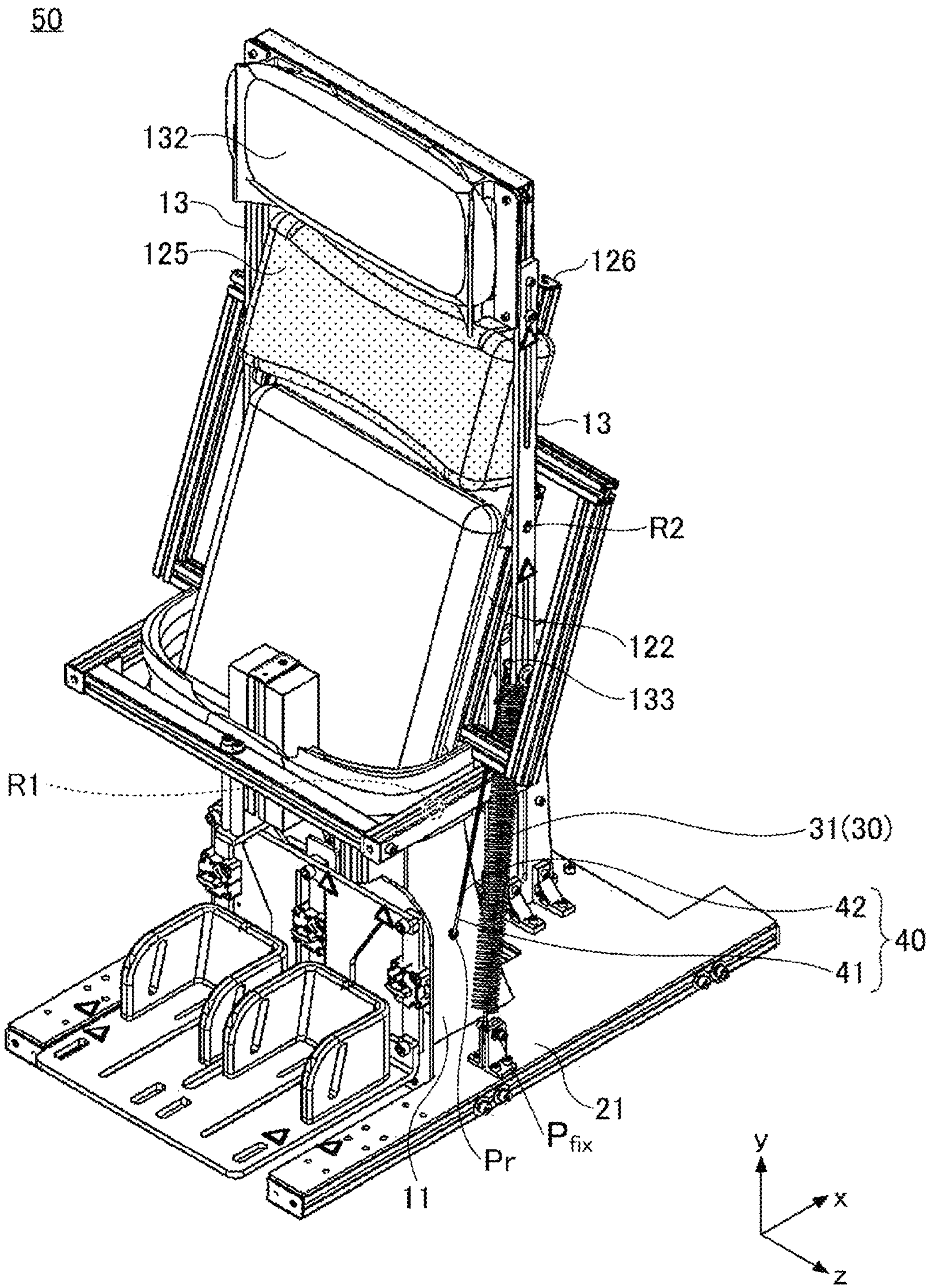
FIG. 14B is a perspective view of a standing position state of the assistance device of the second embodiment.

FIG. 14A is a perspective view of the sitting position state, and FIG. 14B is a perspective view of the standing position state of an assistance device 50 of the second embodiment. Similarly to the first embodiment, the assistance device 50 includes the base 21, the first link 11 fixed to the base 21, the second link 12 rotatably coupled to the first link 11, the third link 13 rotatably coupled to the second link, and the elastic connection portion 30 incorporated between the predetermined position Pfix on the first link 11 or the base 21 and the third link 13. In the second embodiment, the assistance device 50 includes a stopper mechanism 40 disposed between a first coupling point Pr on the first link 11 or the base 21 and a second coupling point 133 on the third link 13.

One end of the stopper mechanism 40 is connected to the first coupling point Pr, and the other end is connected to the second coupling point 133. The stopper mechanism 40 has a length that is variable with the posture transition between the sitting position and the standing position of the assistance device 50. In the illustrated example, the stopper mechanism 40 has a cylinder-type slider structure, and includes a cylinder rod 41 and a cylinder tube 42. In the illustrated example, the cylinder rod 41 is rotatably attached with respect to the first coupling point Pr and the cylinder tube 42 is rotatably attached with respect to the second coupling point 133, but the orientation of attachment of the stopper mechanism 40 may be reversed as long as they are rotatable about the coupling point at both ends. That is, the cylinder tube 42 may be rotatably attached to the first coupling point Pr, and the cylinder rod 41 may be rotatably attached to the second coupling point 133.

The elastic connection portion 30 of the assistance device 50 does not include a wire and is formed only of the spring 31. One end of the spring 31 is coupled to the fixed position Pfix on the base, and the other end is coupled to the coupling point 131 on the third link 13. In the sitting position of FIG. 14A, the spring 31 is in an initial state. In FIG. 14B, when the user stands up, by the assistance force of the passive actuator 14 (see FIGS. 1 and 2) provided inside the first link 11, the second link 12 rotates counterclockwise with respect to the first link 11, and the third link 13 rotates with respect to the second link 12. In the transition process to the standing position, the elastic connection portion 30 (i.e., the spring 31) extends and the stopper mechanism 40 extends. By the restoring force when the spring 31 extends, even a user having a weak lower body or upper body can stably stand up without being thrown forward when standing up.

When transitioning from the standing position in FIG. 14B to the sitting position in FIG. 14A, the spring 31 gradually contracts, and the stopper mechanism 40 returns to its original length. In a case of absence of the stopper mechanism 40, if the load is excessively applied to the third link 13 when the assistance device 50 returns to the sitting position, the third link 13 is tilted rearward, and the lower end of the third link 13 approaches the front of the base 21. The spring 31 is elastic and flexible by itself, and when the third link 13 tilts too much on the rear side, the spring 31 sags between the fixed position Pfix and the coupling point 131.

The stopper mechanism 40 suppresses excessive rearward tilting of the third link 13 due to the sag of the spring 31. The stopper mechanism 40 is coupled between the first coupling point Pr and the second coupling point 133 and thus the stopper mechanism 40 becomes shorter than the initial length in the sitting position state. When the stopper mechanism 40 becomes the shortest length, that is, the initial length, the third link 13 does not further rotate clockwise.

Figure 15:
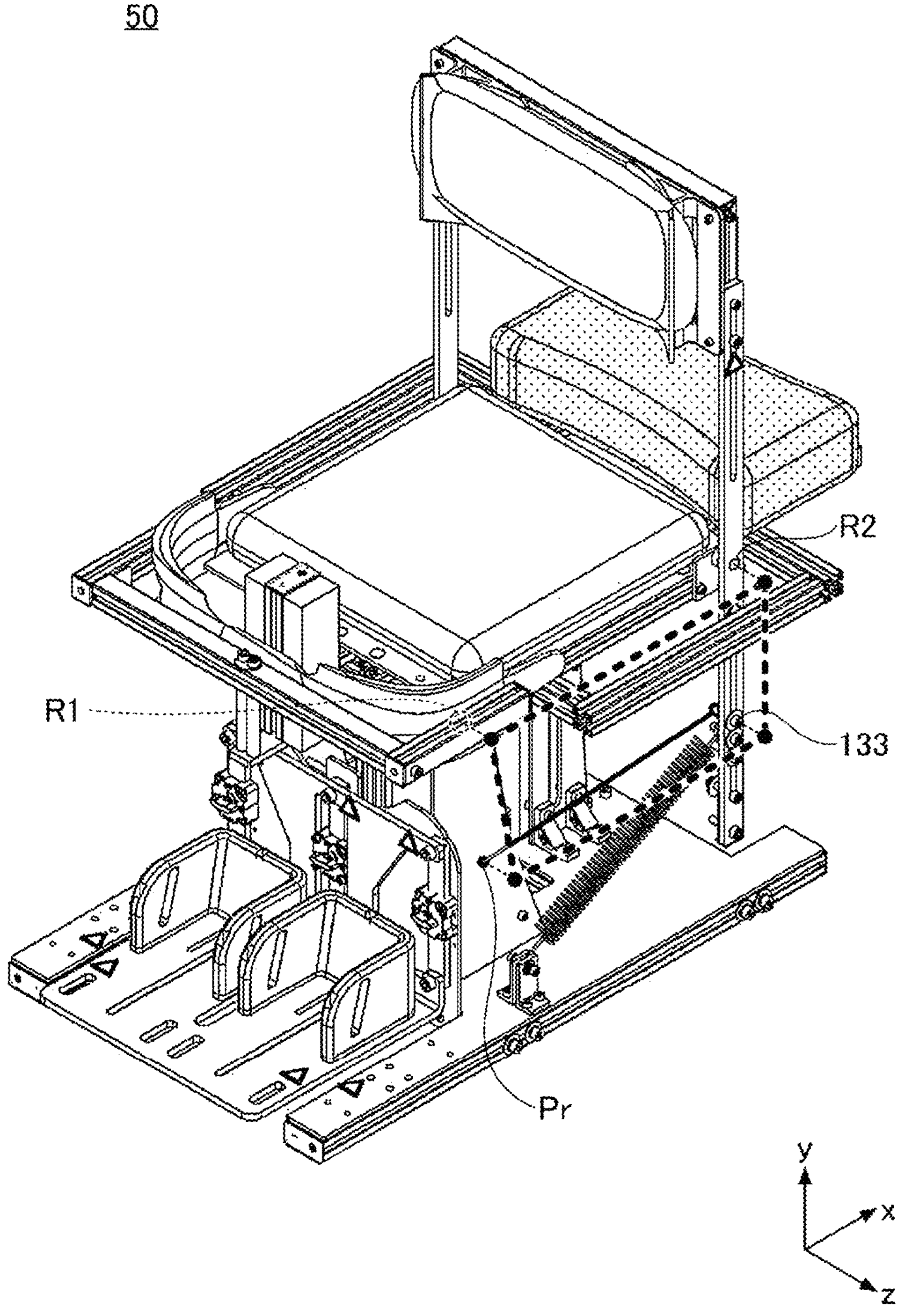
FIG. 15 is a view illustrating a positional relationship between rotation centers R1 and R2 and a coupling point of a stopper mechanism.

FIG. 15 illustrates a positional relationship in a sitting position state between the rotation centers R1 and R2 and coupling points at both ends of the stopper mechanism 40. A quadrangle is formed when the rotation centers R1 and R2 are connected to the first coupling point Pr and the second coupling point 133 of the stopper mechanism 40 in the sitting position state. When extending from the sitting position state to the standing position state in FIG. 14B, the second link 12 and the third link 13 rotate and rise about the rotation centers R1 and R2, respectively. The stopper mechanism 40 enables the third link 13 to perform posture transition from the sitting position to the standing position and from the standing position to the sitting position without excessively tilting rearward. By adjusting the shape of the quadrangle that is formed, it is possible to adjust an angle at which the backrest 13 can be tilted rearward.

When returning from the standing position in FIG. 14B to the sitting position in FIG. 14A, the second link 12 and the third link 13 rotate in the opposite direction to the direction at the time of extension. The stopper mechanism 40 returns to the original length, and the quadrangle connecting R1 and R2, the first coupling point Pr, and the second coupling point 133 return to the shape of FIG. 15. Since the length between the first coupling point Pr and the second coupling point 133 is not shorter than the shortest length of the stopper mechanism 40, the third link 13 holding the backrest 132 does not tilt rearward beyond the initial position in the sitting position state.

In the entire section between the sitting position and the standing position, the rotation angle of the third link 13 with respect to the second link 12 is configured to be maintained within a certain range, and the third link is configured not to tilt rearward beyond a predetermined angle. With this configuration, regardless of the position of the knee of the user, that is, the rotation angle of the knee joint, the third link 13 is optimized to fall within a predetermined angle range. The assistance device 50 has stability at the time of sitting down or after sitting down that is enhanced in addition to stable assistance at the time of standing up.

Figure 16:
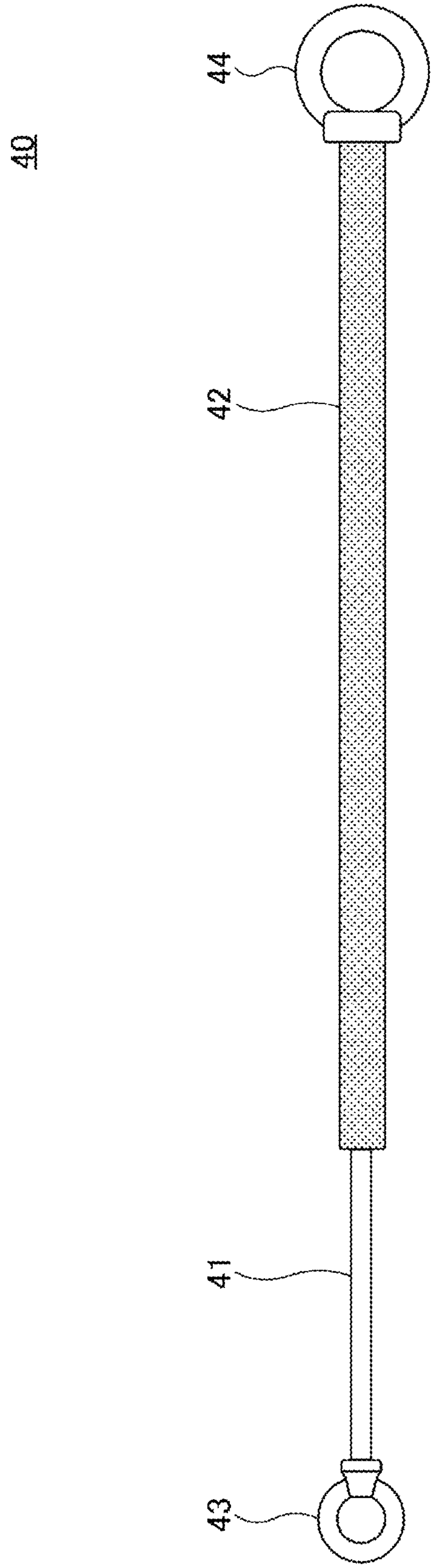
FIG. 16 is a view illustrating a configuration example of the stopper mechanism.

FIG. 16 illustrates a configuration example of the stopper mechanism 40. The stopper mechanism 40 includes the cylinder rod 41, the cylinder tube 42, a ring 43 provided at a tip end of the cylinder rod 41, and a ring 44 provided at a tip end of the cylinder tube 42 on the side opposite to the ring 43. One of the rings 43 and 44 is rotatably connected to the first coupling point Pr, and the other is rotatably connected to the second coupling point 133.

When the assistance device 50 performs posture transition between the sitting position and the standing position, the cylinder rod 41 slides in a long axis direction with respect to the cylinder tube 42, and the entire length of the stopper mechanism 40 changes. The cylinder rod 41 and the cylinder tube 42 are designed to have a length that covers a change in the distance between the first coupling point Pr and the second coupling point 133 throughout the entire section of the sitting position and the standing position of the assistance device 50. The shortest length of the stopper mechanism 40 is determined by the lengths of the cylinder rod 41 and the cylinder tube 42. The shortest length of the stopper mechanism 40 defines the maximum clockwise rotation angle of the third link 13.

Figure 17:
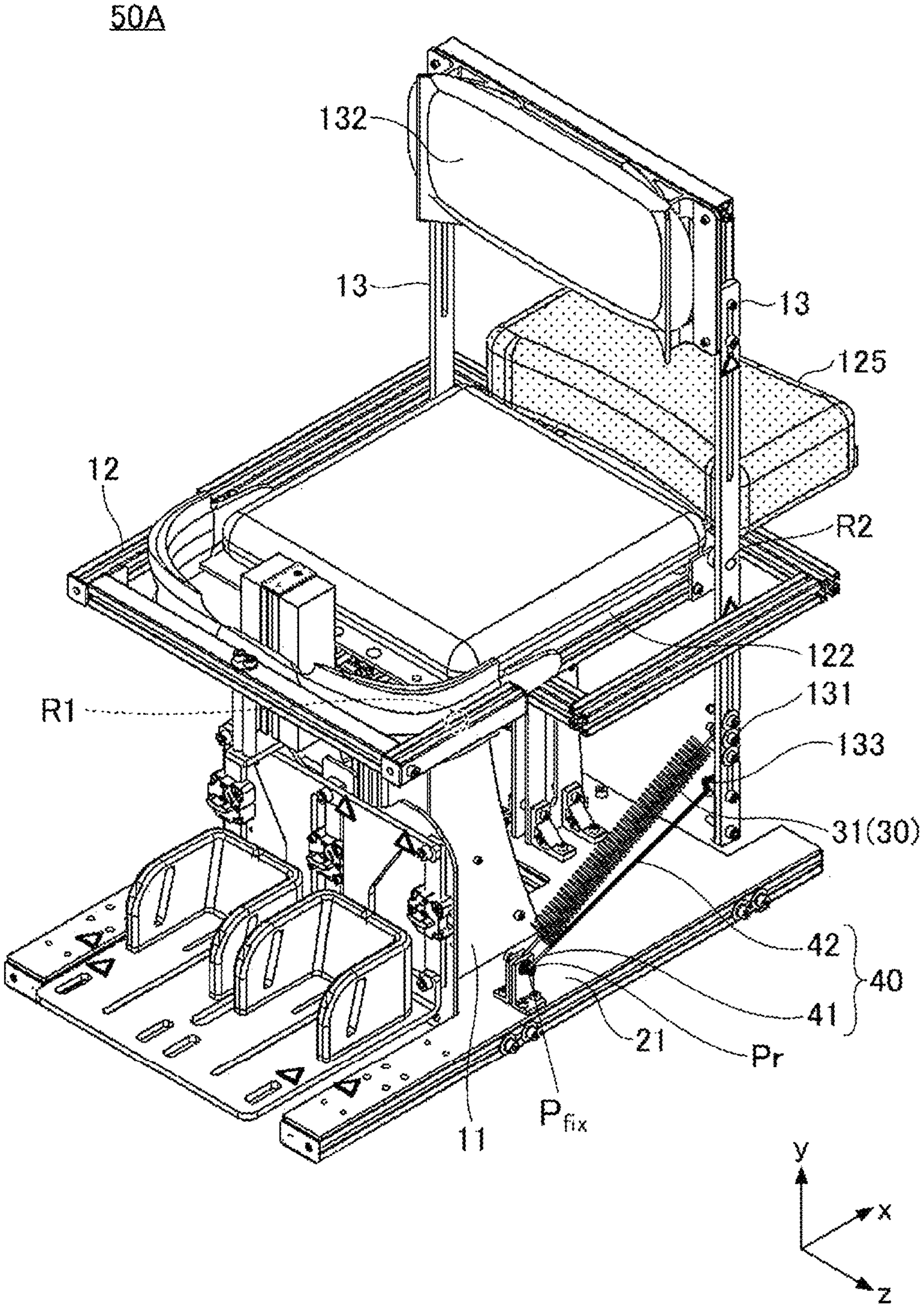
FIG. 17 is a view illustrating another attachment example of the stopper mechanism.

FIG. 17 illustrates another attachment example of the stopper mechanism 40. In an assistance device 50A, one end of the stopper mechanism 40 is rotatably connected to the fixed position Pfix on the base 21, and the other end is fixed to the second coupling point 133 of the third link 13. The elastic connection portion 30 does not include a wire and is formed only of the spring 31.

Also in the configuration of FIG. 17, a quadrangle is formed when the rotation centers R1 and R2 are connected to the fixed position Pfix serving as the first coupling point of the stopper mechanism 40 and the second coupling point 133. When extending from the sitting position state to the standing position state, the second link 12 and the third link 13 rotate about the rotation centers R1 and R2, respectively, and rise to the posture illustrated in FIG. 14B, whereby the spring 31 extends and the stopper mechanism 40 extends.

When the assistance device 50A returns from the standing position to the sitting position in FIG. 17, the second link 12 and the third link 13 rotate in the opposite direction to the direction at the time of extension, the spring 31 contracts, and the stopper mechanism 40 returns to the original length. The quadrangle connecting the rotation centers R1 and R2, the fixed position Pfix as the first coupling point, and the second coupling point 133 returns to the original shape. Since the length between the fixed position Pfix and the second coupling point 133 is not further shortened by the stopper mechanism 40, the third link 13 holding the backrest 132 does not tilt rearward beyond the initial position in the initial sitting position state.

In the entire section between the sitting position and the standing position, the rotation angle of the third link 13 with respect to the second link 12 is maintained within a certain range, and the clockwise rotation beyond a predetermined angle is suppressed. With this configuration, the third link 13 is optimized to fall within a predetermined angle range whatever position of the user's knee is in. The assistance device 50A has stability at the time of sitting down that is enhanced in addition to stable assistance at the time of standing up without inhibiting the posture transition by the stopper mechanism 40.

Third Embodiment

Figure 18:
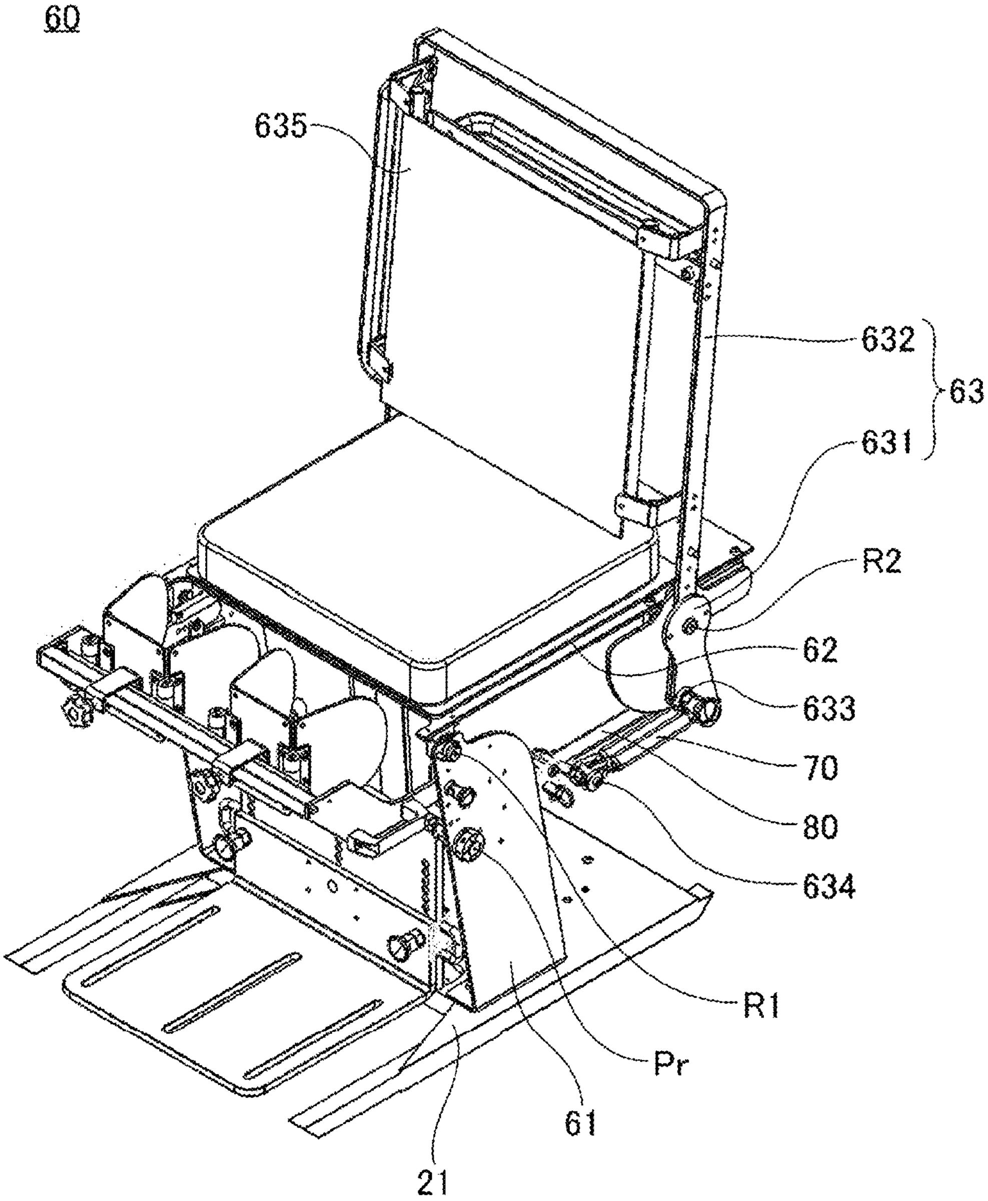
FIG. 18 is a perspective view of a sitting position state of an assistance device of a third embodiment.

FIG. 18 is a perspective view of a sitting position state of an assistance device 60 of the third embodiment. Similarly to the first embodiment and the second embodiment, the assistance device 60 includes the base 21, a first link 61 fixed to the base 21, a second link 62 rotatably coupled to the first link 61, a third link 63 rotatably coupled to the second link, and an elastic connection portion 70 incorporated between a predetermined position on the first link 61 or the base 21 and the third link 63. The third link 63 includes a first portion 631 attached with the elastic connection portion 70 and a second portion 632 attached with a backrest 635. The first portion 631 and the second portion 632 are rotatably connected about the rotation center R2 with respect to the second link 62.

Similarly to the second embodiment, the assistance device 60 includes a stopper mechanism 80 that suppresses excessive rearward tilting of the third link 63. One end of the stopper mechanism 80 is rotatably connected to the first coupling point Pr on the first link 61, and the other end is rotatably connected to a second coupling point 633 on the first portion 631 of the third link 63. The stopper mechanism 80 limits the range of the clockwise rotation angle of the third link 63 with respect to the second link 62.

One end of the elastic connection portion 70 is connected to the stopper mechanism 80 by a shaft 634, and the other end is coupled to the second coupling point 633 on the first portion 631 of the third link 63. The elastic connection portion 70 is connected to the first link 61 via the stopper mechanism 80.

The stopper mechanism 80 and the elastic connection portion 70 are commonly coupled to the second coupling point 633 on the first portion 631 of the third link 63, and one end of the elastic connection portion 70 is coupled to the stopper mechanism 80. In this configuration, the stopper mechanism 80 suppresses excessive rearward tilting of the third link 63 and plays a role of guiding a locus of extension and contraction of the elastic connection portion 70.

Figure 19:
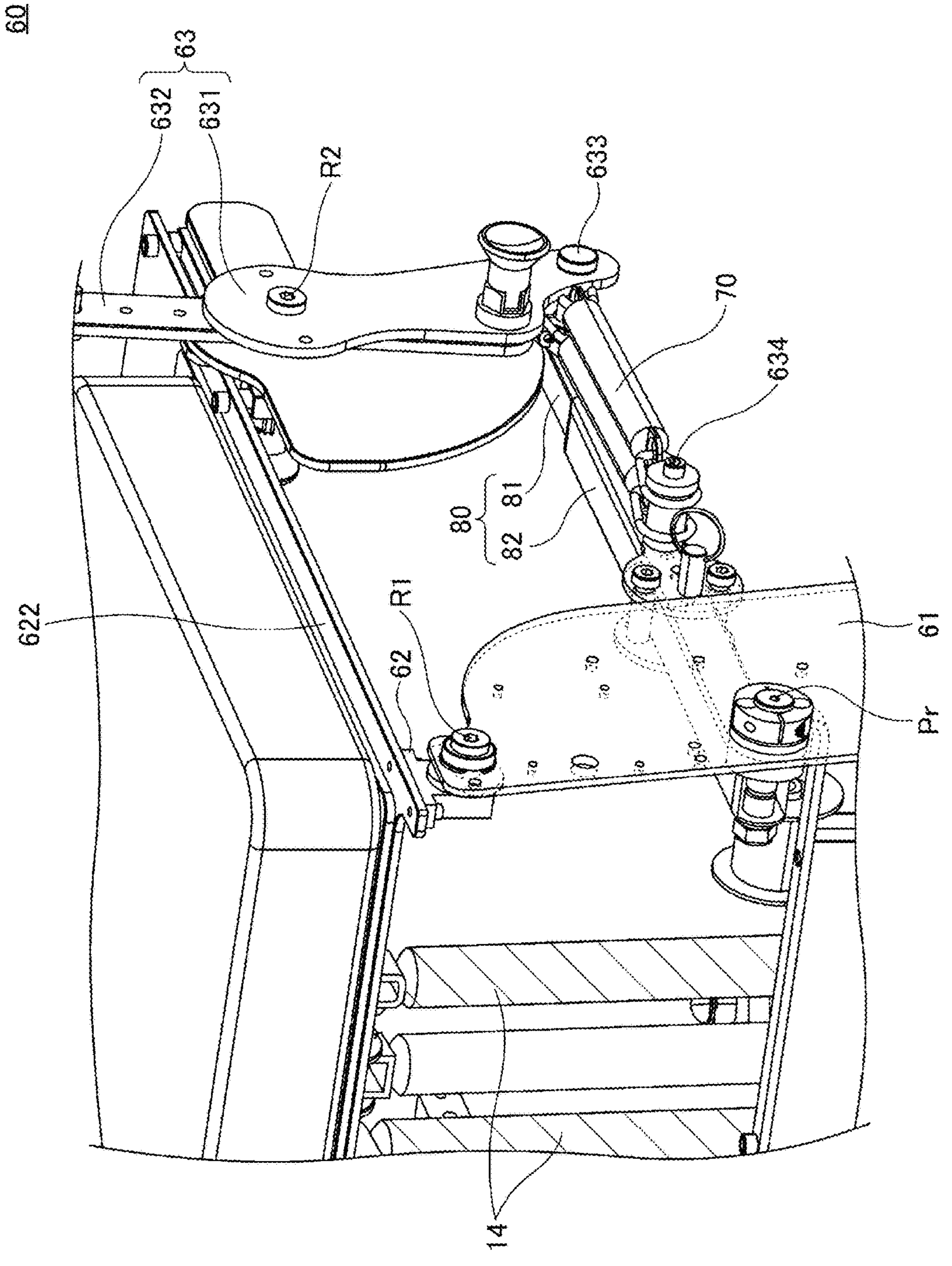
FIG. 19 is a view illustrating a coupling state between the stopper mechanism and the elastic connection portion.

FIG. 19 illustrates a coupling state of the stopper mechanism 80 and the elastic connection portion 70. The stopper mechanism 80 has a slider structure including a slider 81 and a slider guide 82. One end of the slider guide 82 is rotatably connected to the first coupling point Pr on the first link 61, and one end of the elastic connection portion 70 is fixed to a side wall of the slider guide 82. A tip end of the slider 81 is connected to the second coupling point 633 in common with the other end of the elastic connection portion 70. If the third link 63 rotates counterclockwise about the rotation center R2 when the assistance device 60 transitions to the standing position, the slider 81 extends in a long axis direction of the slider guide 82. The elastic connection portion 70 extends in synchronization with the extension of the slider 81.

When the assistance device 60 returns from the standing position to the sitting position, the stopper mechanism 80 does not become shorter than the shortest length determined by the lengths of the slider 81 and the slider guide 82, and therefore the clockwise rotation of the third link 63 with respect to the second link 62 is suppressed. The elastic connection portion 70 is held between the shaft 634 on the slider guide 82 and the second coupling point 633 on the third link 63 without sagging.

Figure 20:
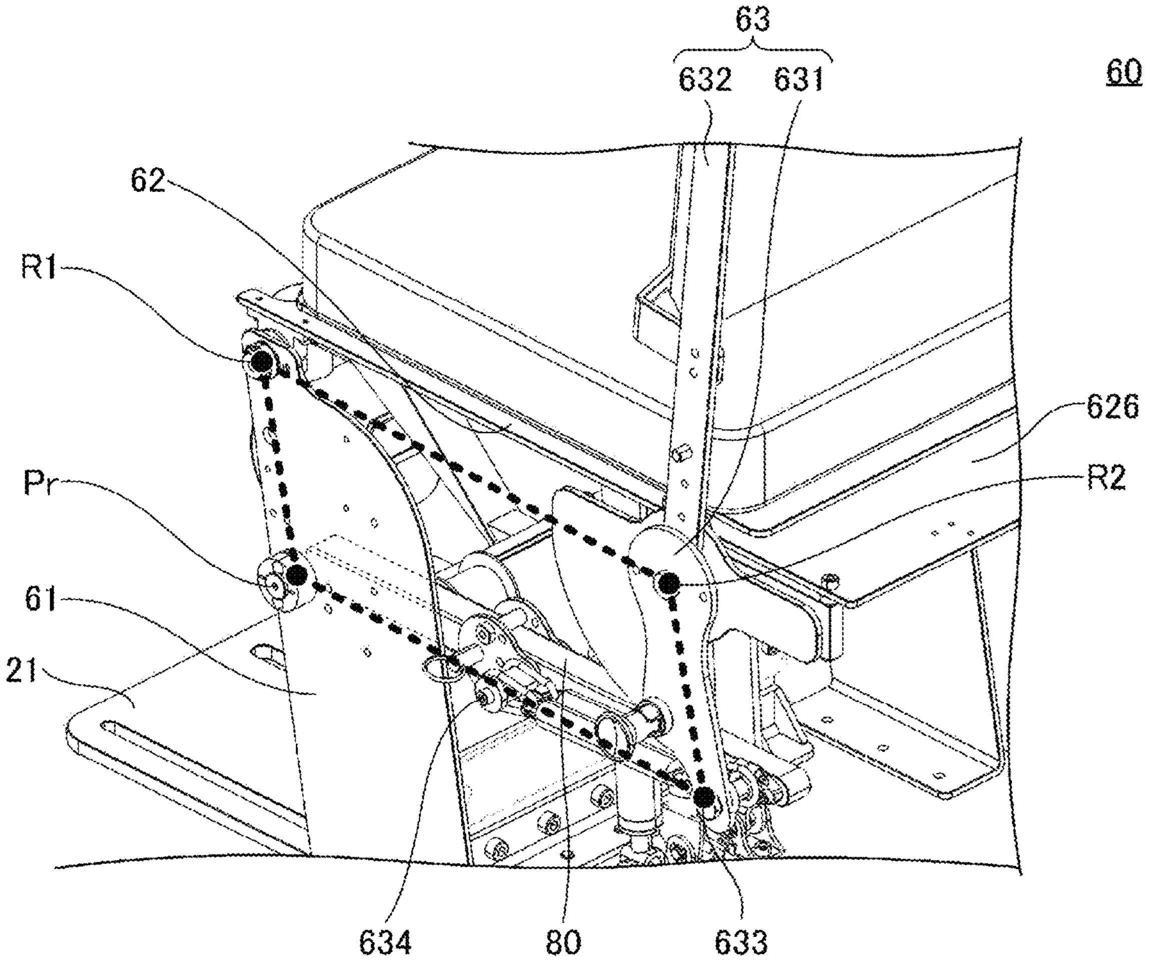
FIG. 20 is a view illustrating a positional relationship between the rotation centers R1 and R2 and the coupling point of the stopper mechanism.

FIG. 20 illustrates a positional relationship between the rotation centers R1 and R2 and the coupling point of the stopper mechanism 80. In the sitting position of FIG. 20, a quadrangle connecting four points of the rotation centers R1 and R2, the first coupling point Pr, and the second coupling point 633 is formed to become a parallelogram. Since the above four points have a parallelogram shape, the third link 63 has a structure that does not always tilt rearward by an identical angle or more while the assistance device 60 transitions from the sitting position to the standing position and from the standing position to the sitting position. Since the third link 63 does not rotate beyond the shortest length of the stopper mechanism 80, the third link 63 does not excessively tilt rearward, and the stability at the time of sitting down is enhanced.

Figure 21:
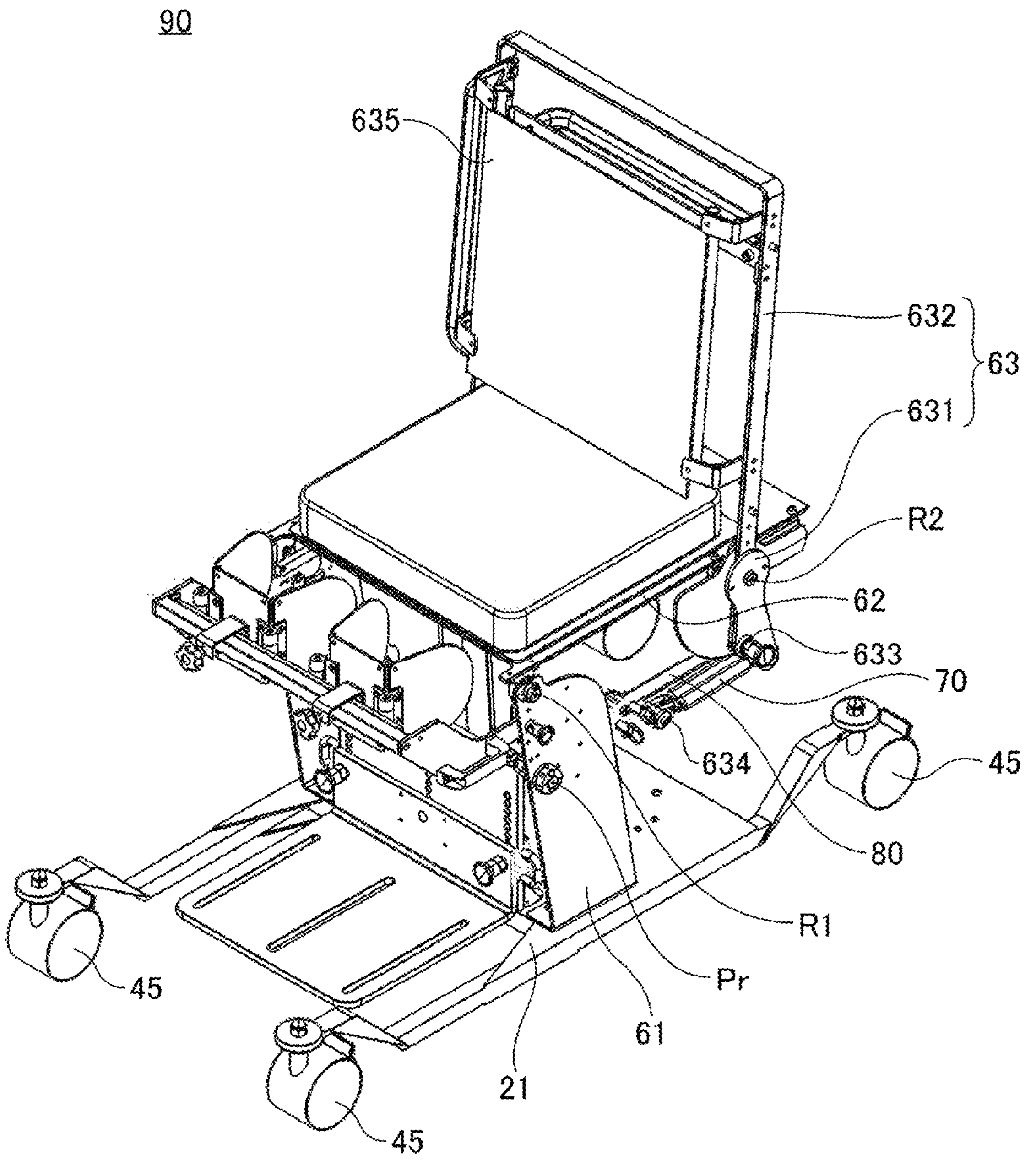
FIG. 21 is a perspective view of a moving device using the assistance device of the third embodiment.

FIG. 21 is a perspective view of a sitting position upper body of a moving device 90 using the assistance device 60. The configuration itself of the assistance device 60 is the same as that illustrated in FIGS. 18 to 20. The moving device 90 includes casters 45 attached to the base 21 of the assistance device 60. In this example, the casters 45 are coupled to the four corners of the base 21, but one caster 45 may be coupled to the center part of the front end of the base 21 as a front wheel. In place of the casters 45, wheels of an electric wheelchair and a drive control device may be combined with the assistance device 60. Regardless of the type of the wheels for movement, customization may be performed in accordance with a moving environment, a use scene, and the like. The moving device 90 may be provided with a stopper and thus the user can safely sit down or stand up while the moving device 90 is stopped. The action of the elastic connection portion 70 and the stopper mechanism 80 at the time of posture change between the sitting position and the standing position is the same as that of the assistance device 60. The moving device 90 can be used as a wheelchair that also serves as rehabilitation equipment in a hospital facility, an office, or at home, and can also be used as a chair at the time of work.

The first embodiment to the third embodiment can be combined with one another. The assistance device 50 or 50A of the second embodiment may be provided with the casters 45, wheels for a wheelchair, or other types of wheels to make a moving device. In the second embodiment, one end of the spring 31 may be connected to the side wall of the cylinder tube 42 of the stopper mechanism 40 of a cylinder type. Also in this case, the spring 31 does not sag, and the stopper mechanism 40 suppresses excessive rearward tilting of the third link 13. The backrest 132 of the first embodiment and the second embodiment may be used in place of the backrest 635 having a large area of the third embodiment, and an extension portion extending rearward of a seating surface 622 may be provided. At this time, the length of the extension portion is desirably 30% to 35% of the length in the front-rear direction of the entire seating surface.

This application claims the priority based on Japanese Patent Application No. 2021-212362 filed on Dec. 27, 2021, and includes the entire content of the Japanese Patent Application.

REFERENCE SIGNS LIST

10, 10A to 10C, 50, 60 Assistance device
11, 61 First link
12, 62 Second link
13, 63 Third link
14 Passive actuator
20, 90 Moving device
21 Base
22 Footrest
30, 70 Elastic connection portion
31 Spring
32 Wire (adjustment member)
40, 80 Stopper mechanism
41 Cylinder rod
42 Cylinder tube
43, 44 Ring
45*f*, 45*r*, 45 Caster
81 Slider
82 Slider guide
111 Pulley
113 Hook
122, 622 Seating surface
124 Cushion
125 Lumbar support pillow
126 Extension portion
131 Coupling point
132, 635 Backrest
133, 633 Second coupling point
631 First portion
632 Second portion
634 Shaft
Pfix Fixed position
Pr First coupling point
R1 Rotation center (of knee joint)
R2 Rotation center (of hip joint)

The invention claimed is:

1. An assistance device comprising:
a base;
a first link fixed to the base and non-rotatable relative to the base;
a second link rotatably coupled to the first link;
a third link rotatably coupled to the second link to support a back of a user; and
an elastic connection portion having a first end fixed to a predetermined position on the first link or the base, and a second end fixed to the third link.

2. The assistance device according to claim 1, wherein
the assistance device can transition between a first position where the second link is substantially parallel to the base and a second position where the second link rises at a predetermined angle from the base, and
the predetermined position on the first link or the base is positioned forward relative to a rotation center of the third link in an entire process in which the assistance device reaches the second position from the first position.

3. The assistance device according to claim 1, comprising:
a stopper mechanism that is connected between the first link or the base and the third link and limits a range of a clockwise rotation angle of the third link with respect to the second link.

4. An assistance device comprising:
a base;
a first link fixed to the base;
a second link rotatably coupled to the first link;
a third link rotatably coupled to the second link;
an elastic connection portion incorporated between a predetermined position on the first link or the base and the third link; and
a stopper mechanism that is connected between the first link or the base and the third link and limits a range of a clockwise rotation angle of the third link with respect to the second link, wherein
the stopper mechanism has a slider structure that is extendable, one end of the slider structure is connected to a first coupling point on the first link or the base, and an other end of the slider structure is connected to a second coupling point on the third link.

5. An assistance device comprising:
a base;
a first link fixed to the base;
a second link rotatably coupled to the first link;
a third link rotatably coupled to the second link;
an elastic connection portion incorporated between a predetermined position on the first link or the base, and the third link; and
a stopper mechanism that is connected between the first link or the base and the third link and limits a range of a clockwise rotation angle of the third link with respect to the second link, wherein
one end of the stopper mechanism is connected to the first link, and an other end of the stopper mechanism is connected to the third link, and
one end of the elastic connection portion is connected to the first link via the stopper mechanism, and an other end of the elastic connection portion is connected to the third link.

6. The assistance device according to claim 2, wherein
the elastic connection portion includes an adjustment member coupled to a coupling point on the third link and an elastic body connected to the adjustment member.

7. The assistance device according to claim 6, wherein
the adjustment member can adjust a distance between the coupling point on the third link and the elastic body, and has one end connected to the coupling point on the third link and an other end connected to the elastic body.

8. The assistance device according to claim 6, wherein
a position of the coupling point is adjustable on the third link.

9. The assistance device according to claim 1, wherein
the second link includes a seating surface, and an extension portion extending rearward from the seating surface, and a length of the extension portion is a length of 30% to 35% of a length in a front-rear direction of the seating surface.

10. A moving device comprising:

the assistance device according to claim 1; and a wheel attached to the base.

11. The moving device according to claim 10, wherein the wheel is a caster wheel.

* * * * *